(12) United States Patent
Yabe et al.

(10) Patent No.: US 10,897,168 B2
(45) Date of Patent: Jan. 19, 2021

(54) MAGNETIZING METHOD, ROTOR, MOTOR, AND SCROLL COMPRESSOR

(71) Applicant: Mitsubishi Electric Corporation, Tokyo (JP)

(72) Inventors: Koji Yabe, Tokyo (JP); Yoshikazu Fujisue, Tokyo (JP); Kazuya Kumagai, Tokyo (JP); Takahiro Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 15/761,455

(22) PCT Filed: Jan. 27, 2016

(86) PCT No.: PCT/JP2016/052269
§ 371 (c)(1),
(2) Date: Mar. 20, 2018

(87) PCT Pub. No.: WO2017/130309
PCT Pub. Date: Aug. 3, 2017

(65) Prior Publication Data
US 2018/0337570 A1 Nov. 22, 2018

(51) Int. Cl.
*H01F 7/20* (2006.01)
*H02K 1/27* (2006.01)
(Continued)

(52) U.S. Cl.
CPC ............ *H02K 1/2766* (2013.01); *F04B 35/04* (2013.01); *F04B 39/00* (2013.01);
(Continued)

(58) Field of Classification Search
CPC ........ H02K 1/02; H02K 1/276; H02K 1/2787; H02K 1/28; H02K 15/03; H02K 2201/03;
(Continued)

(56) References Cited

U.S. PATENT DOCUMENTS 3,678,436 A * 7/1972 Herdrich ............... H01F 13/003
335/284
5,720,590 A * 2/1998 Hofmeister .............. B25J 9/107
414/744.2
(Continued)

FOREIGN PATENT DOCUMENTS

CN 104081630 A 10/2014
EP 85306148 A * 8/1985 ............. H01F 1/057
(Continued)

OTHER PUBLICATIONS

Office Action dated Sep. 4, 2019 issued in correspondin CN patent application No. 201680066810.1 (and English translation).
(Continued)

*Primary Examiner* — Shawki S Ismail
*Assistant Examiner* — Lisa N Homza
(74) *Attorney, Agent, or Firm* — Posz Law Group, PLC

(57) ABSTRACT

A magnetizing method includes the steps of preparing a rotor comprising a rotor core having a magnet insertion hole and a permanent magnet provided in the magnet insertion hole, placing the rotor so as to face a tooth around which a winding is wound, rotating the rotor in a first rotating direction by a first angle θ1 from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle θ2 from the rotational position direction and supplying electric current to the winding. The second angle θ2 is smaller than the first angle θ1.

19 Claims, 13 Drawing Sheets

(51) Int. Cl.
  *H02K 15/03* (2006.01)
  *H02K 1/02* (2006.01)
  *F04B 39/00* (2006.01)
  *F04B 35/04* (2006.01)
  *F04C 18/02* (2006.01)
  *F04C 29/00* (2006.01)
  *H02K 1/14* (2006.01)
  *H02K 7/14* (2006.01)

(52) U.S. Cl.
  CPC ...... *F04C 18/0215* (2013.01); *F04C 29/0085* (2013.01); *H02K 1/02* (2013.01); *H02K 1/146* (2013.01); *H02K 1/27* (2013.01); *H02K 1/276* (2013.01); *H02K 7/14* (2013.01); *H02K 15/03* (2013.01); *F04C 2240/40* (2013.01); *H02K 2201/03* (2013.01); *H02K 2213/03* (2013.01)

(58) Field of Classification Search
  CPC ..... H02K 2213/03; F04B 39/00; F04C 18/02; F04C 18/0215; F04C 23/008; F04C 29/0085; H02J 1/00
  USPC .......................................................... 335/284
  See application file for complete search history.

(56) References Cited

U.S. PATENT DOCUMENTS

| | | | | |
|---|---|---|---|---|
| 5,753,989 | A * | 5/1998 | Syverson | B60L 50/15 310/114 |
| 5,773,908 | A * | 6/1998 | Stephens | H02K 1/146 310/156.47 |
| 2004/0070361 | A1* | 4/2004 | Carrier | H01F 13/003 318/700 |
| 2005/0133117 | A1* | 6/2005 | Tayu | H01F 1/0576 148/105 |
| 2007/0137733 | A1* | 6/2007 | Dong | H01F 1/0577 148/105 |
| 2010/0038985 | A1* | 2/2010 | Shim | H02K 15/03 310/156.43 |
| 2011/0234038 | A1* | 9/2011 | Kobayashi | H02K 1/2766 310/156.43 |
| 2012/0060547 | A1* | 3/2012 | Fujisue | F04B 35/04 62/498 |
| 2012/0242182 | A1* | 9/2012 | Yabe | H02K 29/03 310/156.53 |
| 2012/0256509 | A1* | 10/2012 | Lee | H02K 1/148 310/156.53 |
| 2012/0267975 | A1* | 10/2012 | Nishimura | H02K 1/148 310/156.01 |
| 2012/0326547 | A1* | 12/2012 | Suzuki | H02K 1/2746 310/156.15 |
| 2013/0140922 | A1* | 6/2013 | Yabe | H02K 1/2706 310/51 |
| 2013/0169392 | A1* | 7/2013 | Mongeau | H02K 15/03 335/284 |
| 2013/0221784 | A1* | 8/2013 | Kori | H02K 1/27 310/90 |
| 2013/0266471 | A1 | 10/2013 | Wang | |
| 2014/0021820 | A1* | 1/2014 | Kondou | H02K 1/2766 310/156.53 |
| 2014/0232230 | A1* | 8/2014 | Yabe | H02K 1/276 310/156.11 |
| 2015/0084468 | A1* | 3/2015 | Nigo | H02K 1/276 310/156.53 |
| 2015/0091404 | A1* | 4/2015 | Funakoshi | H02K 1/278 310/156.21 |
| 2015/0137648 | A1* | 5/2015 | Kato | H02K 1/276 310/156.53 |
| 2015/0139830 | A1* | 5/2015 | Nigo | H02K 21/16 417/410.1 |
| 2017/0179802 | A1* | 6/2017 | Fujisue | F25B 31/026 |
| 2018/0048202 | A1* | 2/2018 | Kumagai | H02K 1/27 |
| 2018/0337570 | A1* | 11/2018 | Yabe | H02K 1/2766 |
| 2019/0052137 | A1* | 2/2019 | Yabe | H02K 1/28 |
| 2019/0074738 | A1* | 3/2019 | Yabe | F24F 1/10 |
| 2019/0081523 | A1* | 3/2019 | Yabe | H02K 1/02 |
| 2019/0356185 | A1* | 11/2019 | Yabe | H02K 1/2766 |
| 2020/0014259 | A1* | 1/2020 | Yabe | H02K 1/276 |

FOREIGN PATENT DOCUMENTS

| | | |
|---|---|---|
| JP | H11-266570 A | 9/1999 |
| JP | 2000-152569 A | 5/2000 |
| JP | 2012-172622 A | 9/2012 |
| JP | 2013-219352 A | 10/2013 |
| JP | 2014-072223 A | 4/2014 |
| JP | 2015-100208 A | 5/2015 |
| JP | 2015-116025 A | 6/2015 |

OTHER PUBLICATIONS

International Search Report of the International Searching Authority dated Apr. 5, 2016 for the corresponding International application No. PCT/JP2016/052269 (and English translation).
Office Action dated Aug. 6, 2018 in the corresponding Australian Patent Application No. 2016390095 (and English translation thereof).
Office Action dated Jul. 17, 2018 in the corresponding Japanese Patent Application No. 2017-563444 (and English translation).
Office Action dated Jun. 27, 2019 issued in corresponding KR patent application No. 10-2018-7011795 (and English translation).
Office Action dated Mar. 16, 2020 issued in corresponding CN patent application No. 201680066810.4 (and English translation).
Office Action dated May 14, 2020 issued in corresponding in patent application No. 201847017282 (and English translation).

\* cited by examiner

MAGNETIZING METHOD, ROTOR, MOTOR, AND SCROLL COMPRESSOR

CROSS REFERENCE TO RELATED APPLICATION

This application is a U.S. national stage application of International Patent Application No. PCT/JP2016/052269 filed on Jan. 27, 2016, the disclosure of which is incorporated herein by reference.

TECHNICAL FIELD

The present invention relates to a rotor of a motor of a permanent magnet embedded type, a magnetizing method thereof, and the motor and a scroll compressor employing the rotor.

BACKGROUND ART

In a motor of a permanent magnet embedded type, a rotor in which a magnetic member is mounted is assembled in a stator or a magnetization yoke, and electric current is supplied to a winding of the stator or the magnetization yoke to generate magnetization flux so that the magnetic member is magnetized to become a permanent magnet.

Conventionally, in order to uniformly magnetize the magnetic member, it is proposed to perform magnetization twice by changing a rotational position of the rotor. Specifically, it is proposed to perform a first magnetization at a certain rotational position, then rotate the rotor, and perform a second magnetization (see Patent Reference 1).

PATENT REFERENCE

Patent Reference 1: Japanese Patent Application Publication No. 11-266570 (see Paragraph 0035 and FIGS. 4 and 5)

However, in the second magnetization step, an attractive force or repulsive force is generated by interaction between an already-magnetized part of the permanent magnet and the magnetization flux. Therefore, it is necessary to hold a shaft of the rotor with a strong force, and it is necessary to increase a strength of a jig or the like for holding the shaft.

SUMMARY

The present invention is intended to solve the above described problem, and an object of the present invention is to reduce a force required to hold the shaft of the rotor and to simplify the magnetization of the permanent magnet.

A magnetizing method according to the present invention includes the steps of preparing a rotor including a rotor core having a magnet insertion hole and a permanent magnet provided in the magnet insertion hole, placing the rotor so as to face a tooth around which a winding is wound, rotating the rotor in a first rotating direction by a first angle $\theta 1$ from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle $\theta 2$ from the rotational position and supplying electric current to the winding. The second angle $\theta 2$ is smaller than the first angle $\theta 1$.

A rotor according to the present invention includes a rotor core having a magnet insertion hole and a permanent magnet provided in the magnet insertion hole. The permanent magnet is magnetized by placing the rotor so as to face a tooth around which a winding is wound, rotating the rotor in a first rotating direction by a first angle $\theta 1$ from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle $\theta 2$ from the rotational position and supplying electric current to the winding. The second angle $\theta 2$ is smaller than the first angle $\theta 1$.

A motor according to the present invention includes a stator and a rotor provided inside the stator. The rotor includes a rotor core having a magnet insertion hole and a permanent magnet provided in the magnet insertion hole. The permanent magnet is magnetized by placing the rotor so as to face a tooth around which a winding is wound, rotating the rotor in a first rotating direction by a first angle $\theta 1$ from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle $\theta 2$ from the rotational position and supplying electric current to the winding. The second angle $\theta 2$ is smaller than the first angle $\theta 1$.

A scroll compressor according to the present invention includes a closed container, a compression mechanism provided in the closed container, and a motor to drive the compression mechanism. The motor includes a stator and a rotor provided inside the stator. The rotor includes a rotor core having a magnet insertion hole and a permanent magnet provided in the magnet insertion hole. The permanent magnet is magnetized by placing the rotor so as to face a tooth around which a winding is wound, rotating the rotor in a first rotating direction by a first angle $\theta 1$ from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle $\theta 2$ from the rotational position and supplying electric current to the winding. The second angle $\theta 2$ is smaller than the first angle $\theta 1$.

According to the present invention, the rotor is rotated in the first rotating direction and in the second rotating direction, and therefore the magnetization can be performed while making a direction of magnetization flux and an easy magnetization direction be closer to parallel with each other on one end side and the other end side of the permanent magnet. Further, by setting the second angle $\theta 2$ smaller than the first angle $\theta 1$, the force generated in the rotor in the second magnetization step can be restrained. Accordingly, a force required to hold a shaft of the rotor can be reduced.

DETAILED DESCRIPTION

First Embodiment (Configuration of Motor)

First, a first embodiment of the present invention will be described. The first embodiment is intended to reduce electric current required for magnetization of a permanent magnet and to restrain a force generated in a rotor by interaction between the permanent magnet and magnetization flux at a time of magnetization of the permanent magnet mounted in the rotor of a motor of a permanent magnet embedded type.

Figure 1:
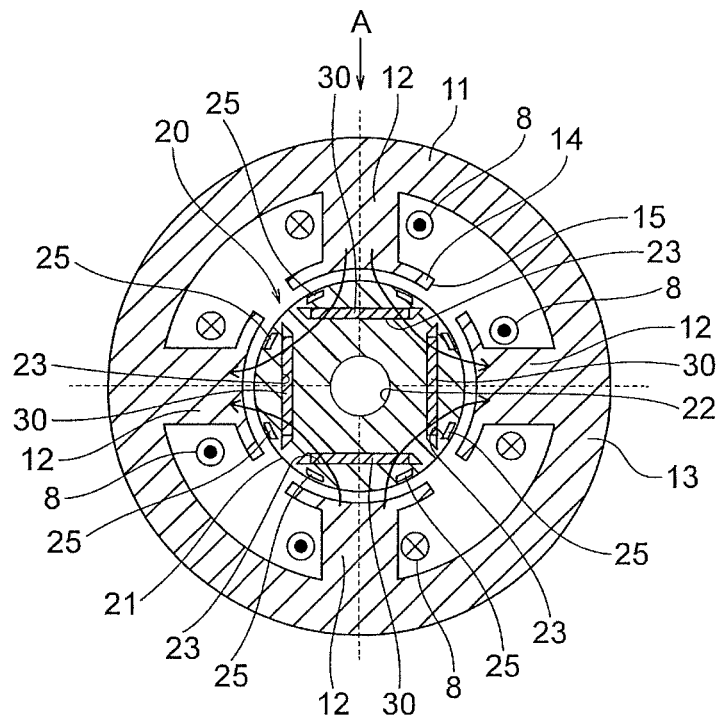
FIG. 1 is a sectional view showing a configuration for magnetization of permanent magnets of a rotor of a first embodiment of the present invention.

FIG. 1 is a sectional view showing a configuration for magnetization of permanent magnets 30 of a rotor 20 of the first embodiment of the present invention. FIG. 1 is a sectional view at a plane perpendicular to a rotation axis of the rotor 20. The rotor 20 is of a permanent magnet embedded type that is employed in, for example, a scroll compressor 300 (see FIG. 8).

As shown in FIG. 1, a magnetization yoke 11 is used for magnetization of the permanent magnets 30 of the rotor 20. The magnetization yoke 11 includes a yoke part 13 having an annular shape and a plurality of (four in this example) teeth 12 protruding inward in a radial direction from the yoke part 13. A slot is formed between adjacent teeth 12. The magnetization yoke 11 is formed by stacking a plurality of electromagnetic steel sheets (stacking elements) in a direction of the rotation axis, each of the electromagnetic steel sheets having a thickness of, for example, 0.35 mm.

A winding 8 (a coil) is wound around each tooth 12 of the magnetization yoke 11. A not-shown insulation part (an insulator or the like) is provided between the tooth 12 and the winding 8. Each tooth 12 has a shape such that its tip end part 14 on a protruding side (an inner side in the radial direction) is extended in a circumferential direction. A gap 15 is formed between the tip end parts 14 of the adjacent teeth 12.

(Configuration of Rotor)

The rotor 20 includes a rotor core 21 and the permanent magnets 30 mounted in the rotor core 21. The rotor core 21 is formed by stacking a plurality of electromagnetic steel sheets (stacking elements) in the direction of the rotation axis, each of the electromagnetic steel sheets having a thickness of, for example, 0.35 mm. The rotor core 21 has a cylindrical shape, and a shaft hole 22 is formed at a center (a center in the radial direction) of the rotor core 21. The shaft defining the rotation axis penetrates the shaft hole 22.

Hereinafter, a direction along an outer circumference (a circumference of a circle) of the rotor core 21 is referred to simply as a "circumferential direction". Further, an axial direction of the rotor core 21 (a direction of the rotation axis) is referred to simply as an "axial direction". Further, the radial direction of the rotor core 21 is referred to simply as a "radial direction".

Along an outer circumferential surface of the rotor core 21, a plurality of (four in this example) magnet insertion holes 23 are formed, and a permanent magnet 30 is inserted into each of the magnet insertion holes 23. The magnet insertion holes 23 are evenly arranged in the circumferential direction of the rotor core 21.

Figure 2:
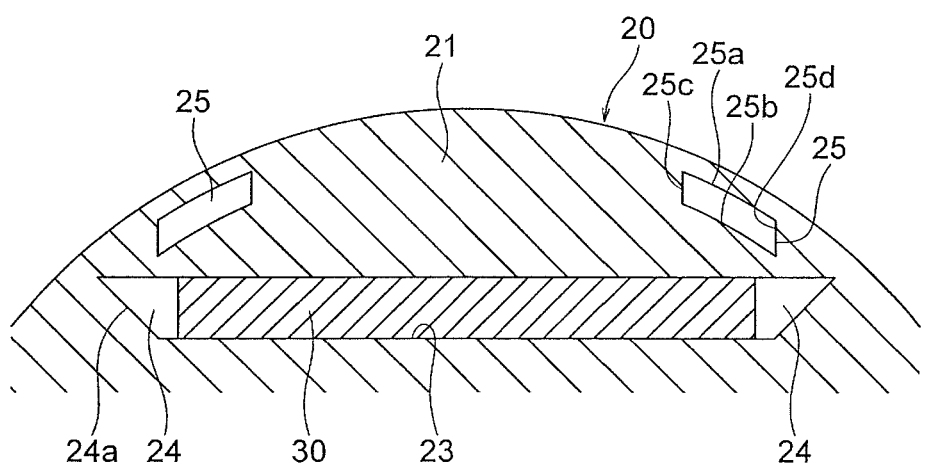
FIG. 2 is a sectional view showing a part of the rotor of the first embodiment in an enlarged scale.

FIG. 2 is a sectional view showing, in an enlarged scale, a part of the rotor 20 where the magnet insertion hole 23 is formed. The magnet insertion hole 23 extends straight along the circumferential direction. In this example, the magnet insertion hole 23 extends in a direction perpendicular to the radial direction of the rotor core 21 at a center of the magnet insertion hole 23 (i.e., a center of a magnetic pole) in the circumferential direction.

The permanent magnet 30 is a plate-like member having a shape elongated in the axial direction of the rotor core 21, and has a width in the circumferential direction of the rotor core 21 and a thickness in the radial direction of the rotor core 21. The permanent magnet 30 is magnetized in the radial direction of the rotor core 21 (i.e., a thickness direction of the permanent magnet 30) to have an N-pole on an inner side in the radial direction and an S-pole on an outer side in the radial direction, for example. The permanent magnet 30 is formed of, for example, a neodymium rare earth magnet as described later.

In this example, one permanent magnet 30 is inserted in each magnet insertion hole 23, and one permanent magnet 30 forms one magnetic pole. Four permanent magnets 30 are mounted in the rotor 20, and thus the rotor 20 has four magnetic poles in total. However, a plurality of permanent magnets 30 may be inserted in each magnet insertion hole 23 so that the plurality of permanent magnets 30 form one magnetic pole (see FIG. 10) as described later.

A dimension of the magnet insertion hole 23 in the circumferential direction is longer than the width of the permanent magnet 30. The magnet insertion hole 23 has a leakage magnetic flux restraining part 24, which is a hole, at each end in the circumferential direction. The leakage magnetic flux restraining parts 24 are provided for restraining leakage magnetic flux between the permanent magnets 30 at an interpolar part. In this example, the leakage magnetic flux restraining part 24 has an inclined surface 24a so that a width of the leakage magnetic flux restraining part 24 becomes narrower as a distance to an end of the magnet insertion hole 23 in the circumferential direction decreases.

Figure 19:
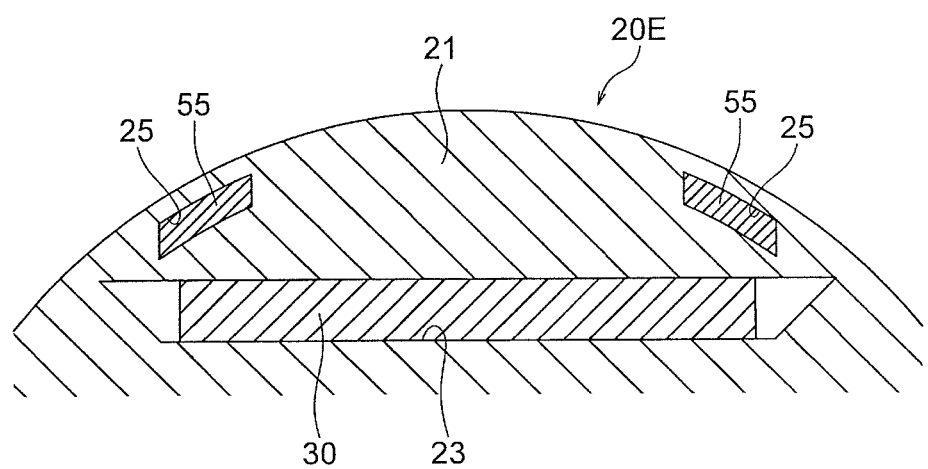
FIG. 19 is a sectional view showing a configuration of a rotor of a modification.

In the rotor core 21, slits 25 are formed on an outer side of the magnet insertion hole 23 in the radial direction. An inside of the slit 25 is a void, but may be a non-magnetic material (see FIG. 19). That is, the slit 25 is a part that restrains passage of magnetic flux. The slits 25 are provided for restraining a force generated in the rotor 20 by interaction between the permanent magnets 30 and the magnetization flux at a time of magnetization of the permanent magnets 30 as described later.

The slits 25 are located at positions symmetrical to each other with respect to a center of the magnet insertion hole 23 in the circumferential direction (i.e., a center of the magnetic pole). More specifically, the slits 25 are located at both ends of the magnet insertion hole 23 in the circumferential direction.

The slit 25 has a shape elongated in the circumferential direction of the rotor core 21. More specifically, the slit 25 has inner walls 25a and 25b located respectively on an outer side and an inner side in the radial direction, and inner walls 25c and 25d connecting the ends of the inner walls 25a and 25b to each other. The inner walls 25a and 25b extend in parallel with the outer circumference of the rotor core 21.

(Magnetizing Method of Permanent Magnets)

Figure 3A:
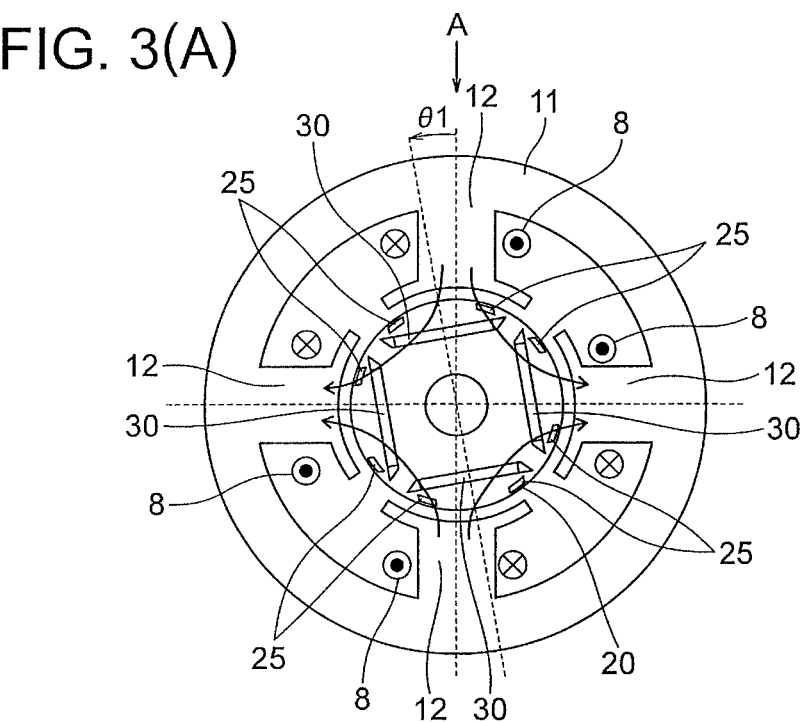
FIGS. 3(A) and 3(B) are schematic diagrams for illustrating a first magnetization step and a second magnetization step in the first embodiment.
Figure 3B:
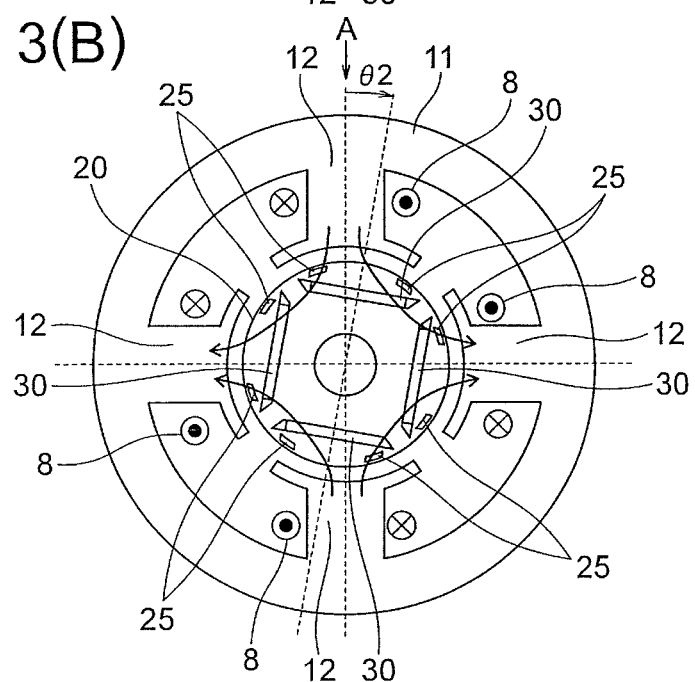
Figure 4A:
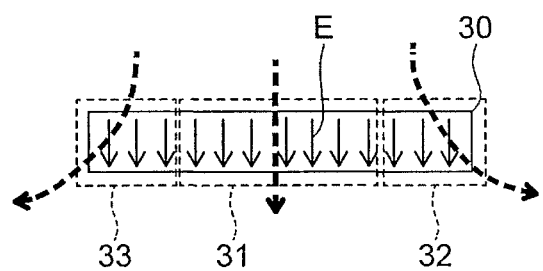
FIGS. 4(A), 4(B) and 4(C) are schematic diagrams showing a relationship between the permanent magnet and magnetization flux in a reference state, in the first magnetization step and in the second magnetization step in the first embodiment.
Figure 4B:
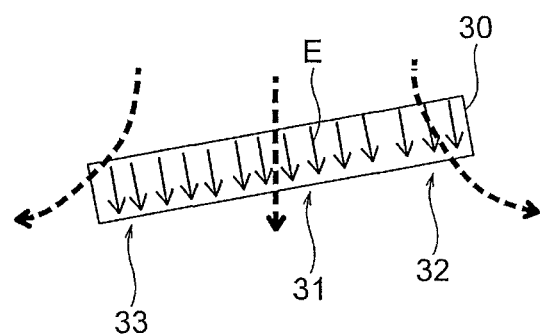
Figure 4C:
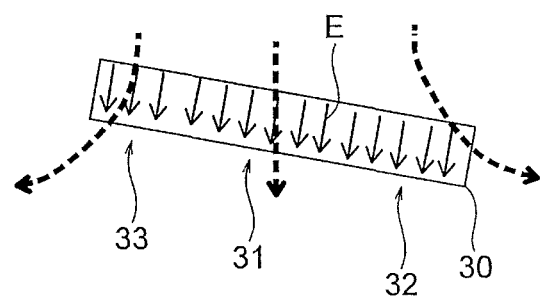

Next, a magnetizing method of the permanent magnets 30 in this embodiment will be described. FIGS. 3(A) and 3(B) are schematic diagrams respectively showing a first magnetization step and a second magnetization step in the magnetizing method of the permanent magnets 30. FIGS. 4(A), 4(B) and 4(C) are schematic diagrams showing a relationship between the permanent magnet 30 and the magnetization flux in a reference state, the first magnetization step and the second magnetization step.

The magnetization of the permanent magnets 30 is performed in a state where the rotor 20 is formed by inserting magnetic materials that are to become the permanent magnets 30 into the magnet insertion holes 23 of the rotor core 21. There are roughly two types of magnetization methods of the permanent magnets 30.

One is a method using the magnetization yoke 11 (FIG. 1) separate from a stator of the motor. In this case, the rotor 20 is assembled in the magnetization yoke 11. Then, the magnetization flux is generated by supplying electric current to the winding 8 wound around the magnetization yoke 11 so that the permanent magnets 30 inserted in the magnet insertion holes 23 of the rotor 20 are magnetized.

The other is a method using a stator 10 (see FIG. 11) of the motor. In this case, the rotor 20 is assembled in the stator 10, and then the stator 10 is mounted in a compressor (for example, the scroll compressor 300 shown in FIG. 9). Then, the magnetization flux is generated by supplying electric current to a winding of the stator 10 (for example, a winding 9 shown in FIG. 11) so that the permanent magnets 30 inserted in the magnet insertion holes 23 of the rotor 20 are magnetized.

Hereinafter, the magnetizing method of the permanent magnets 30 using the magnetization yoke 11 shown in FIG. 1 will be described. Incidentally, although the permanent magnet 30 before magnetization is a magnetic material, the magnetic material before the magnetization is also referred to as a permanent magnet 30 for simplicity of description.

First, as shown in FIG. 1, the rotor 20 is assembled in the magnetization yoke 11 so that an outer circumferential surface of the rotor 20 faces the teeth 12. In this step, the rotor 20 is placed at a rotational position (a reference rotational position) where the center of the magnet insertion hole 23 in the circumferential direction faces a middle portion (indicated by an arrow A) between both ends of the winding 8 in the circumferential direction.

The center of the magnet insertion hole 23 in the circumferential direction corresponds to the center of the magnetic pole of the rotor 20. Further, the middle portion between both ends of the winding 8 in the circumferential direction (hereinafter referred to as ends in the circumferential direction) corresponds to a center of the magnetization flux caused by the electric current flowing through the winding 8. In an example shown in FIG. 1, one winding 8 faces one permanent magnet 30, and thus the middle portion between the ends of the winding 8 in the circumferential direction coincides with a winding axis of the winding 8.

Figure 11:
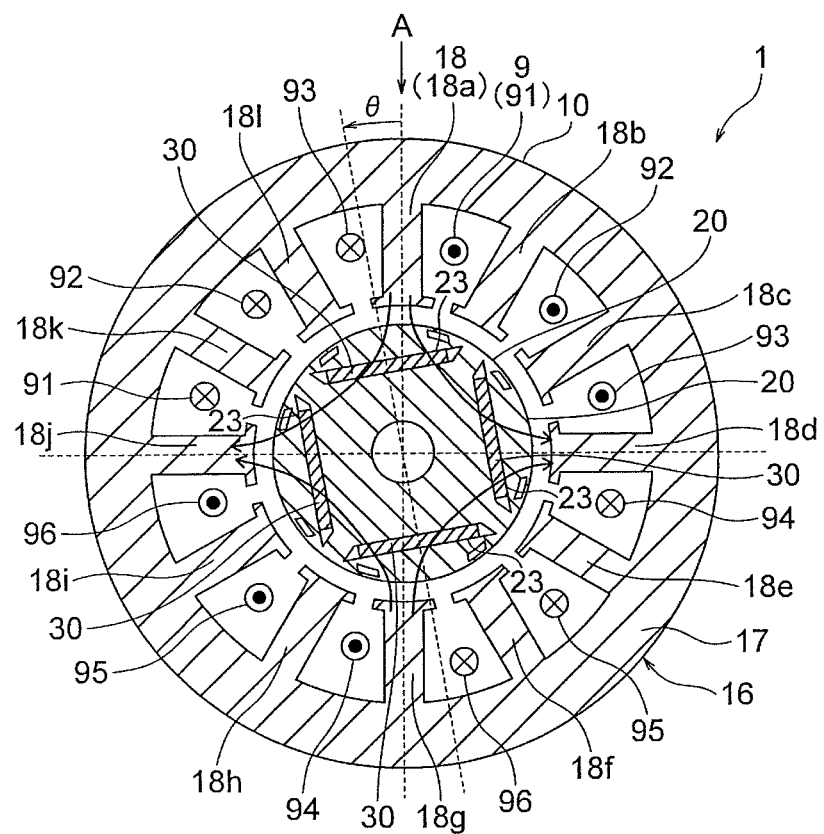
FIG. 11 is a sectional view showing a configuration of a motor of a third embodiment of the present invention.
Figure 12:
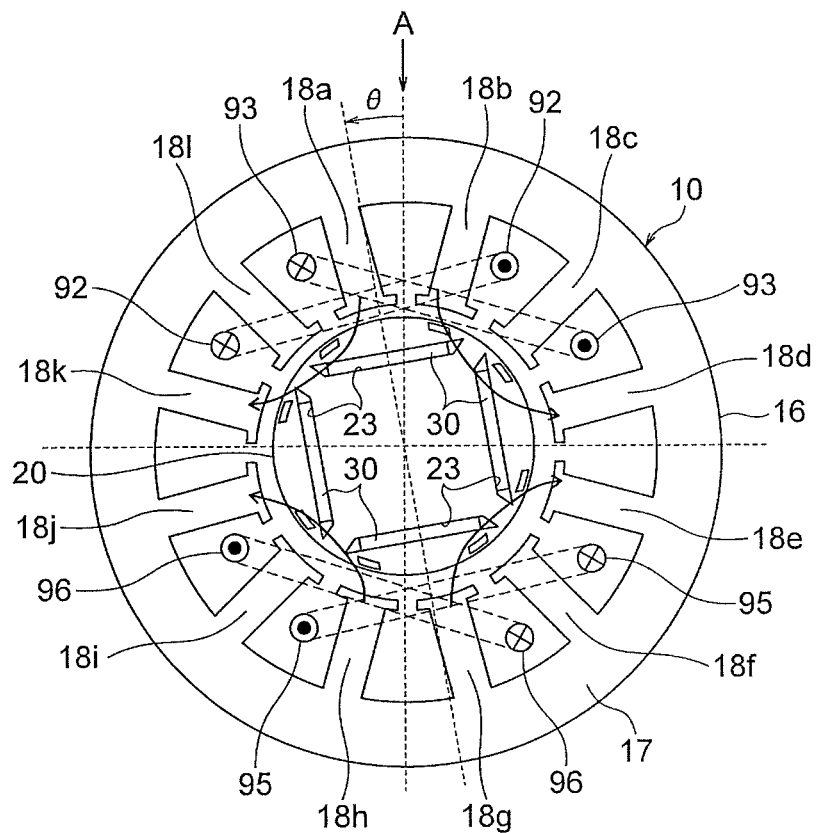
FIG. 12 is a sectional view for illustrating a magnetizing method of the third embodiment.

Incidentally, in a case where the permanent magnets 30 are magnetized by using the stator 10 (FIGS. 11 and 12) of the motor, the rotor 20 is placed at a rotational position where the center of the magnet insertion hole 23 in the circumferential direction faces a middle portion between the ends of the winding of the stator 10 in the circumferential direction (for example, a rotational position where the circumferential center of the uppermost magnet insertion hole 23 faces the middle portion between ends of the windings 92 and 93 in the circumferential direction in an example shown in FIG. 12).

Then, as shown in FIG. 3(A), the rotor 20 is rotated counterclockwise (in a first rotating direction) from the above described rotational position (FIG. 1) by a first angle θ1.

Figure 9:
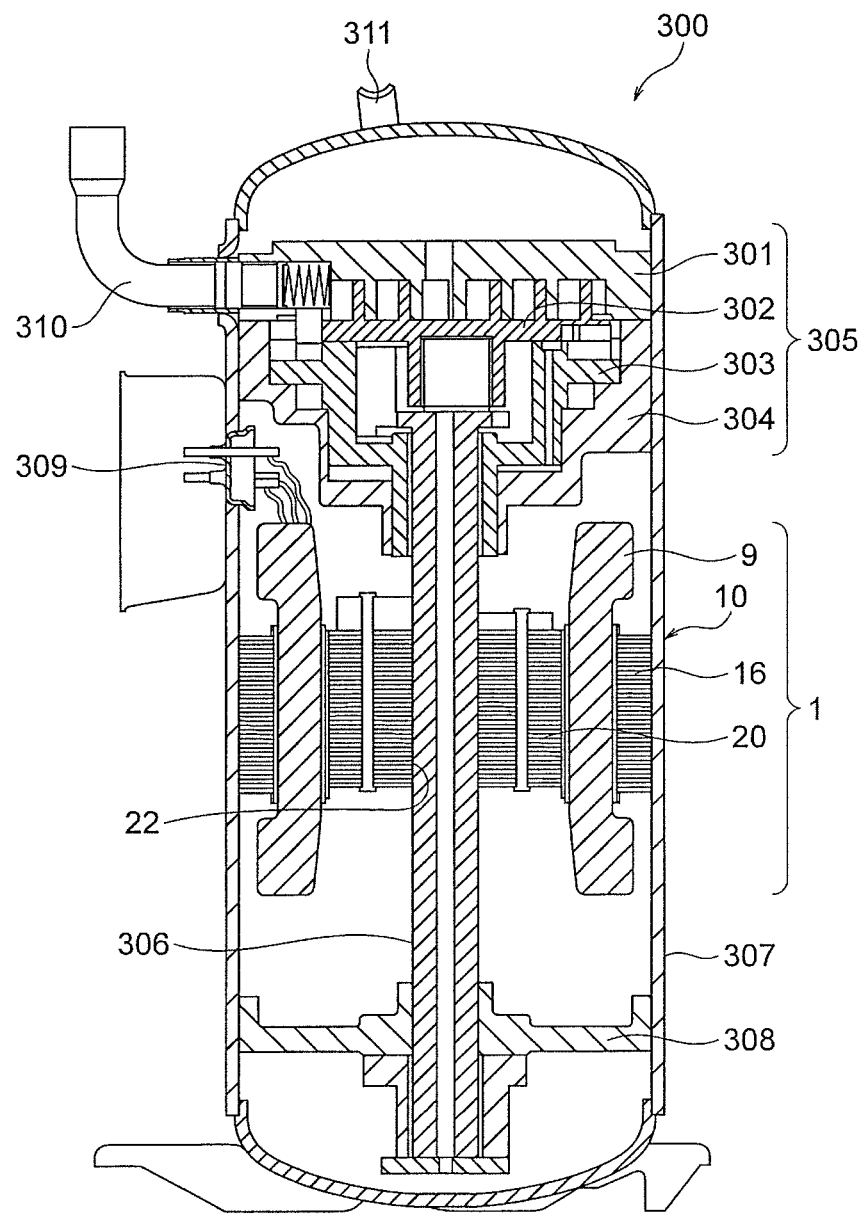
FIG. 9 is a sectional view showing a configuration of a scroll compressor employing a motor of the first embodiment.

The rotor 20 is rotated by rotating a shaft (for example, a shaft 306 of the scroll compressor 300 shown in FIG. 9) engaged with the shaft hole 22 (FIG. 1) at the center of the rotor 20, by using a jig. Incidentally, the rotor 20 is configured to rotate integrally with the shaft inserted into the shaft hole 22 by means of, for example, shrink fitting or a keyway.

In FIG. 4(A), the permanent magnet 30 before magnetization is a plate-like magnetic member, and a thickness direction thereof defines an easy magnetization direction E. In FIG. 4(A), the permanent magnet 30 is divided in a width direction into three parts, which are referred to as a central part 31, a first end part 32 and a second end part 33.

When the rotor 20 is rotated in the first rotating direction by the first angle θ1 (FIG. 3(A)), a direction of the magnetization flux (indicated by thick arrows) caused by the electric current flowing through the winding 8 (referred to also as "magnetization current") and the easy magnetization direction E become closer to parallel with each other in a region of the permanent magnet 30 ranging from the first end part 32 to the central part 31 as shown in FIG. 4(B). Thus, the region of the permanent magnet 30 ranging from the first end part 32 to the central part 31 (referred to as one end side of the permanent magnet 30) is efficiently magnetized.

Then, as shown in FIG. 3(B), the rotor 20 is rotated in a second rotating direction opposite to the first rotating direction from the above described rotational position (FIG. 1) by a second angle θ2.

Accordingly, as shown in FIG. 4(C), the direction of the magnetization flux (indicated by thick arrows) and the easy magnetization direction E become closer to parallel with each other in a region of the permanent magnet 30 ranging from the second end part 33 to the central part 31. Thus, the region of the permanent magnet 30 ranging from the second end part 33 to the central part 31 (referred to as the other end side of the permanent magnet 30) is efficiently magnetized.

By changing the rotational position of the rotor 20 in this way, the direction of the magnetization flux and the easy magnetization direction E are made to be closer to parallel with each other on the one end side and the other end side of the permanent magnet 30. Thus, the magnetization can be efficiently performed. Accordingly, the magnetization current (a magnetization voltage) required for the magnetization of the permanent magnet 30 can be reduced and the permanent magnet 30 can be uniformly magnetized.

Incidentally, although the first magnetization step (FIG. 3(A)) and the second magnetization step (FIG. 3(B)) are performed in this example, it is also possible to add a further magnetization step and perform three or more magnetization steps in total.

(Angle of Rotor in Magnetization Step)

In the above described first magnetization step (FIG. 3(A)), the one end side of the permanent magnet 30 is magnetized. Thus, in the second magnetization step (FIG. 3(B)), a force (an attractive force or repulsive force) is caused by the interaction between the already-magnetized part of the permanent magnet 30 and the magnetization flux caused by the electric current flowing through the winding 8. This force acts on the rotor 2 in a direction to rotate the rotor 20 around the shaft.

The shaft engaged with the rotor 20 is held by the jig. In order to hold the rotor 20 to prevent its rotation at the time of the magnetization, it is necessary to hold the shaft of the rotor 20 with a strong force, and it is necessary to increase the strength of the jig.

Hereinafter, a description will be given of desirable ranges of the first angle θ1 in the first magnetization step and the second angle θ2 in the second magnetization step for reducing the magnetization current and restraining the force generated in the rotor 20 by the interaction between the permanent magnet 30 and the magnetization flux.

Figure 5:
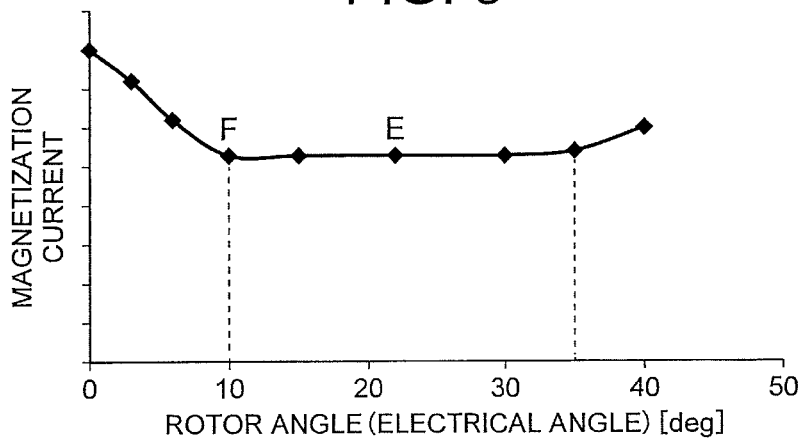
FIG. 5 is a graph showing a relationship between an angle of the rotor and magnetization current in the first embodiment.

FIG. 5 is a graph showing a relationship between the angle of the rotor 20 and the magnetization current required for the magnetization of the permanent magnet 30. The angle of the rotor 20 is represented by an electrical angle. For example, when the rotor 20 has four magnetic poles, a mechanical angle of 180 degrees corresponds to an electrical angle of 360 degrees. For example, when the rotor 20 has six magnetic poles, a mechanical angle of 120 degrees corresponds to an electrical angle of 360 degrees.

Figure 6:
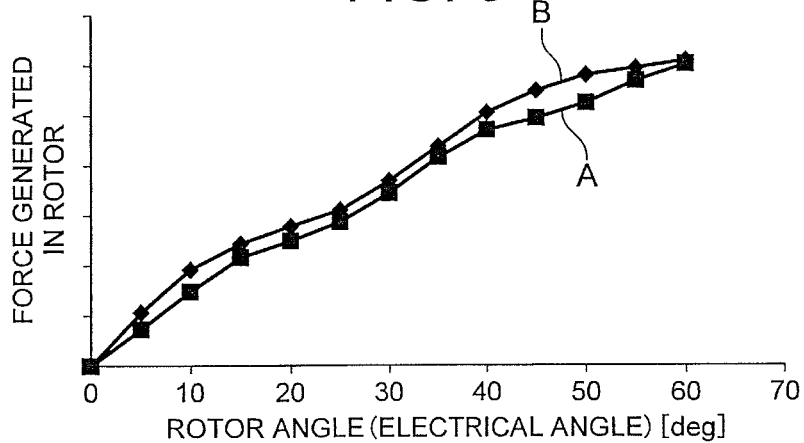
FIG. 6 is a graph showing a relationship between the angle of the rotor and a force generated in the rotor of the first embodiment.

FIG. 6 is a diagram showing the relationship between the second angle θ2 of the rotor 20 and the force generated in the rotor 20 in the second magnetization step (FIG. 3(B)). The second angle θ2 of the rotor 20 is represented by an electrical angle. In FIG. 6, a curve A indicates a case where the rotor 20 is provided with the slits 25, and a curve B indicates a case where the rotor 20 is not provided with the slits 25.

From the graph of FIG. 5, it is understood that the magnetization current for the magnetization of the permanent magnet 30 decreases significantly when the angle θ (electrical angle) of the rotor 20 is in a range from 0 to 10 degrees, and that the magnetization current for the magnetization of the permanent magnet 30 is restrained when the angle θ is in a range from 10 to 35 degrees. Further, from the curves A and B in FIG. 6, it is understood that the force acting on the rotor 20 decreases as the second angle θ2 decreases.

Desirable ranges of the first angle θ1 in the first magnetization step and the second angle θ2 in the second magnetization step are obtained from the result shown in FIGS. 5 and 6.

Specifically, the first magnetization step is performed in the state where the permanent magnet 30 is not yet magnetized, and thus no force is generated by the interaction between the permanent magnet 30 (magnetic material at this stage) and the magnetization flux in the first magnetization step. Therefore, from a viewpoint of reducing the magnetization flux, the first angle θ1 is desirably within a range from 10 to 35 degrees (electrical angle) based on the result shown in FIG. 5.

In contrast, the second magnetization step is performed in the state where the one end side of the permanent magnet 30 is magnetized, and thus a force is generated in the rotor 20 by the interaction between the already-magnetized part of the permanent magnet 30 and the magnetization flux. Therefore, the desirable range of the second angle θ2 is different from the desirable range of the first angle θ1. Specifically, from the result shown in FIG. 6, the second angle θ2 is desirably as small as possible.

From these results, it is understood that the first angle θ1 is desirably within the range from 10 to 35 degrees. Further, it is understood that the second angle θ2 is desirably smaller than the first angle θ1.

Figure 7:
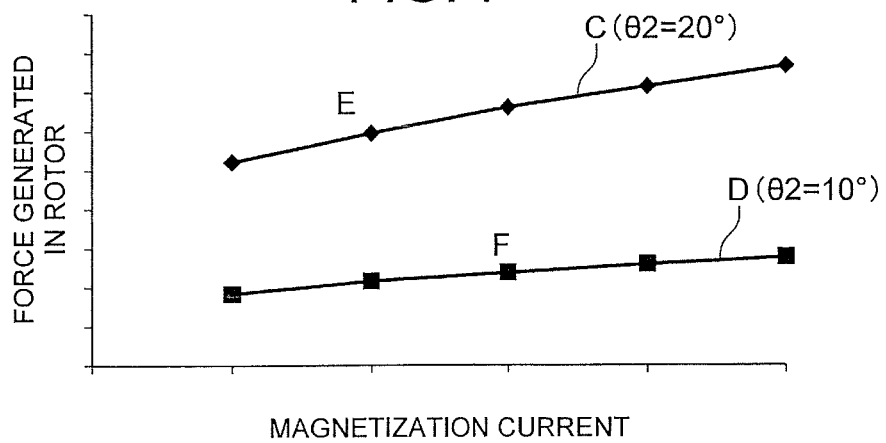
FIG. 7 is a graph showing a relationship between the magnetization current and the force generated in the rotor of the first embodiment.

This point will be described in more detail below. FIG. 7 is a graph showing a relationship between the magnetization current and the force generated in the rotor 20 in the second magnetization step. In FIG. 7, a straight line C indicates data in a case where the second angle θ2 is set to 20 degrees (electrical angle), and a straight line D indicates data in a case where the second angle θ2 is set to 10 degrees (electrical angle).

In the case where the second angle θ2 is set to 20 degrees, the magnetization current can be reduced according to FIG. 5 as described above. Thus, for example, the permanent magnet 30 can be magnetized with magnetization current represented by a point E in FIG. 7. In the case where the second angle θ2 is set to 10 degrees, the permanent magnet 30 can be magnetized with magnetization current slightly higher than that in the case where the second angle θ2 is 20 degrees according to FIG. 5. Specifically, the permanent magnet 30 can be magnetized with magnetization current represented by a point F in FIG. 7.

When the point E and the point F shown in FIG. 7 are compared with each other, it is understood that the force acting on the rotor 20 is stronger at the point E where the second angle θ2 is larger.

From this result, it is understood that the force acting on the rotor 20 is highly dependent on the second angle θ2 rather than on the magnetization current. In other words, it is understood that the second angle θ2 is desirably as small as possible in order to reduce the force acting on the rotor 20.

In this regard, from a viewpoint of reducing a load on the winding 8 and reducing energy consumption, the magnetization current is also desirably as low as possible. Especially, in a case where the permanent magnet 30 is magnetized by using the stator 10 of the motor 1 as shown in FIG. 11 as described later, the winding 9 cannot be firmly fixed to a tooth 18 since it is necessary to restrain damage to the winding 9 of the stator 10. Therefore, this embodiment in which the force generated in the rotor 20 at the time of the magnetization is restrained is especially effective when the magnetization is performed by using the stator 10 of the motor.

From the above results, it is understood that it is desirable to reduce the magnetization current in the first magnetization step by setting the first angle θ1 of the rotor 20 within the range from 10 to 35 degrees, and to reduce the force acting on the rotor 20 (even when the magnetization current increases) in the second magnetization step by setting the second angle θ2 of the rotor 20 smaller than the first angle θ1. Incidentally, it is sufficient that the second angle θ2 is smaller than the first angle θ1, and is larger than or equal to 0 degrees.

Further, as described above, the magnetization current for the magnetization of the permanent magnet 30 decreases when the angle of the rotor 20 is in the range from 0 to 10 degrees (electrical angle), and the magnetization current for the magnetization of the permanent magnet 30 is restrained to be small when the angle of the rotor 20 is in the range from 10 to 35 degrees (electrical angle). Thus, the second angle θ2 is desirably within the range of from 10 to 35 degrees.

In a case where the shaft 306 (FIG. 8) and the rotor 20 are fixed to each other by means of shrink fitting, the force for fixing the shaft 306 and the rotor 20 to each other tends to be weaker as compared with a case where the shaft 306 and the rotor 20 are fixed to each other by means a keyway. As described above, in the first magnetization step, the magnetization current can be reduced by setting the first angle θ1 of the rotor 20 within the range from 10 to 35 degrees. In the second magnetization step, the force acting on the rotor 20 can be reduced (even when the magnetization current increases) by setting the second angle θ2 of the rotor 20 smaller than the first angle θ1. Therefore, this embodiment is especially effective in a case where the shaft 306 and the rotor 20 are fixed to each other by means of shrink fitting.

(Material of Permanent Magnet)

Next, material of the permanent magnet 30 will be described. The permanent magnet 30 is formed of a neodymium rare earth magnet containing iron (Fe), neodymium (Nd), boron (B) and dysprosium (Dy). Dysprosium is a substance added for the purpose of enhancing coercive force, but is a rare earth element. Thus, when dysprosium content increases, manufacturing cost increases. Thus, in order to reduce the manufacturing cost, it is desirable that the dysprosium content is less than or equal to 4 weight percent.

In general, when the dysprosium content in a neodymium rare earth magnet decreases, the coercive force decreases. Therefore, in order to restrain demagnetization caused by decrease in the dysprosium content, the permanent magnet 30 has a sufficient thickness so as to increase permeance. In this regard, when the thickness of the permanent magnet 30 increases, the permanent magnet 30 is less likely to be magnetized, and thus the electric current required for the magnetization of the permanent magnet 30 increases.

In this first embodiment, the first magnetization step is performed after rotating the rotor 20 in the first rotating direction by the first angle θ1, and the second magnetization step is performed after rotating the rotor 20 in the second rotating direction by the second angle θ2 (<the first angle θ1). Therefore, the magnetization current required for the magnetization of the permanent magnet 30 can be reduced even in the rotor 20 in which the dysprosium content is less than or equal to 4 weight percent for the purpose of reducing the manufacturing cost. Further, by setting the second angle θ2 smaller than the first angle θ1, the force generated in the rotor 20 in the second magnetization step can be restrained, and accordingly the force required to hold the shaft of the rotor 20 can be reduced.

In order to minimize the decrease in the coercive force due to the decrease in the dysprosium content, it is desirable to diffuse dysprosium in the permanent magnet 30. However, the diffusion of dysprosium degrades magnetizability, and increases the magnetization current necessary for the magnetization.

In this first embodiment, the first magnetization step is performed after the rotor 20 is rotated in the first rotating direction by the first angle θ1, and the second magnetization step is performed after the rotor 20 is rotated in the second rotating direction by the second angle θ2 (<the first angle θ1) as described above. Thus, even in the rotor 20 in which dysprosium is diffused for the purpose of restraining the decrease in the coercive force, the magnetization current required for the magnetization of the permanent magnet 30 can be reduced. Further, by setting the second angle θ2 smaller than the first angle θ1, the force generated in the rotor 20 in the second magnetization step can be restrained, and accordingly the force required to hold the shaft of the rotor 20 can be reduced.

Incidentally, it is also possible to add terbium to the permanent magnet 30 instead of dysprosium. Terbium is a substance added for the purpose of enhancing the coercive force, but is a rare earth element as is the case with dysprosium. When the terbium content increases, the manufacturing cost increases. Thus, the terbium content is set to be less than or equal to 4 weight percent. Further, in order to minimize the decrease in the coercive force due to the decrease in the terbium content, it is desirable to diffuse terbium in the permanent magnet 30.

Also in this case, as described above in regard to dysprosium, the thickness of the permanent magnet 30 is increased for the purpose of increasing the permeance, and the magnetization current increases due to the diffusion of terbium. However, the magnetization current required for the magnetization of the permanent magnet 30 can be reduced by performing the first magnetization step and the second magnetization step as described above. Further, by setting the second angle θ2 smaller than the first angle θ1, the force generated in the rotor 20 in the second magnetization step can be restrained, and accordingly the force required to hold the shaft of the rotor 20 can be reduced.

(Function of Slits)

As shown in FIG. 2, the rotor 20 includes the slits 25 on the outer side of the permanent magnet 30 in the radial direction. Since the slits 25 (void parts or non-magnetic materials) restrain the passage of magnetic flux, the magnetization flux flowing through the already-magnetized part of the permanent magnet 30 decreases. Further, a reluctance torque can be reduced by provision of the slits 25. As a result, the force generated in the rotor 20 by the interaction between the magnetization flux and the permanent magnet 30 can be restrained.

From the above described FIG. 6, it is understood that the force generated in the rotor 20 can be reduced by 5% to 10% in the case where the rotor 20 is provided with the slits 25 (curve A) as compared with the case where the rotor 20 is not provided with the slits 25 (curve B).

As above, by providing the slits 25 on the outer side of the permanent magnet 30 in the radial direction, the force required to hold the shaft of the rotor 20 can be reduced.

That is, it is unnecessary to increase the strength of the jig for holding the shaft, and the magnetization step of the permanent magnets 30 can be simplified.

(Arrangement of Permanent Magnets)

Figure 8:
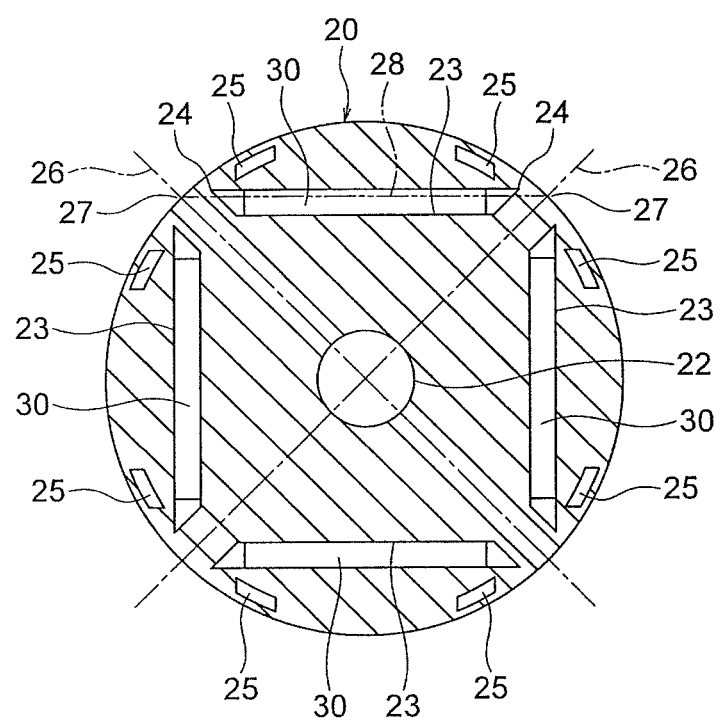
FIG. 8 is a sectional view for illustrating mounting positions of the permanent magnets in the rotor of the first embodiment.

FIG. 8 is a diagram showing desirable arrangement positions of the permanent magnets 30 in the rotor 20. In FIG. 8, each straight line 26 defining an interpolar portion between adjacent magnetic poles of the rotor 20 is indicated by a chain line. Here, a straight line passing through two intersections 27 where two straight lines 26, each defining the interpolar portion, intersect the outer circumference of the rotor 20 is defined as a reference straight line 28.

At least a part of the magnet insertion hole 23 is located on an outer side of the reference straight line 28 in the radial direction. That is, at least a part of the permanent magnet 30 mounted in the magnet insertion hole 23 is located on the outer side of the reference straight line 28 in the radial direction.

By locating the permanent magnet 30 close to the outer circumference of the rotor 20 in this way, the distance between the permanent magnet 30 and the magnetization yoke 11 (the winding 8) is shortened, and thus the density of the magnetic flux passing through the permanent magnet 30 increases. Accordingly, the electric current required for the magnetization of the permanent magnet 30 can be reduced (i.e., magnetizability is enhanced). Further, by locating the permanent magnet 30 close to the outer circumference of the rotor 20, the permanent magnet 30 can have a large width. Accordingly, magnetic force obtained by the same electric current increases and output power of the motor can be increased.

In this regard, when the permanent magnet 30 is located close to the outer circumference of the rotor 20, the magnetizability is enhanced by the shortening of the distance between the permanent magnet 30 and the magnetization yoke 11 (the winding 8), but the force generated in the rotor 20 in the second magnetization step (FIG. 3(B)) by the interaction between the already-magnetized part of the permanent magnet 30 and the magnetization flux also increases.

However, in this first embodiment, the force generated in the rotor 20 can be restrained since the second angle θ2 of the rotor 20 in the second magnetization step is set smaller than the first angle θ1 of the rotor 20 in the first magnetization step.

That is, at least a part of the permanent magnet 30 is located on the radially outer side of the reference straight line 28 passing through the two intersections 27 where the two straight lines 26 defining the interpolar portions intersect the outer circumference of the rotor 20, and the second angle θ2 is smaller than the first angle θ1. Thus, the output power of the motor 1 can be increased, the magnetizability of the permanent magnets 30 can be enhanced, and the force generated in the rotor 20 at the time of the magnetization can be restrained.

(Scroll Compressor)

Next, the scroll compressor 300 as a compressor employing the motor 1 including the rotor 20 of the first embodiment will be described. FIG. 9 is a sectional view showing a configuration of the scroll compressor 300. The scroll compressor 300 includes a closed container 307, a compression mechanism 305 provided in the closed container 307, the motor 1 for driving the compression mechanism 305, the shaft 306 connecting the compression mechanism 305 and the motor 1 to each other, and a sub-frame 308 supporting a lower end part (an end part opposite to the compression mechanism 305 side) of the shaft 306.

The compression mechanism 305 includes a fixed scroll 301 having a scroll part, an oscillating scroll 302 having a scroll part that forms a compression chamber between itself and the scroll part of the fixed scroll 301, a compliance frame 303 holding an upper end part of the shaft 306, and a guide frame 304 fixed to the closed container 307 and holding the compliance frame 303.

An intake pipe 310 penetrating the closed container 307 is press-fitted into the fixed scroll 301. Further, the closed container 307 is provided with a discharge pipe 311 for discharging high-pressure refrigerant gas, which is discharged from the fixed scroll 301, to the outside. This discharge pipe 311 is connected to a not-shown opening provided between the motor 1 and the compression mechanism 305 of the closed container 307. Further, glass terminals 309 for supplying electric power to the motor 1 are fixed to the closed container 307 by welding.

The motor 1 includes the stator 10 and the rotor 20 rotatably provided inside the stator 10. The stator 10 includes a stator core 16 and a winding 9 wound around the stator core 16. Incidentally, the stator core 16 includes a yoke part 17 having an annular shape (FIG. 11) and a plurality of teeth 18 (FIG. 11) protruding inward in the radial direction from the yoke part 17. The winding 9 is wound around each tooth 18.

When the motor 1 rotates, the rotation is transmitted to the oscillating scroll 302, and the oscillating scroll 302 oscillates. When the oscillating scroll 302 oscillates, a capacity of the compression chamber formed between the scroll part of the oscillating scroll 302 and the scroll part of the fixed scroll 301 changes. Accordingly, the refrigerant gas is taken in through the intake pipe 310, compressed, and discharged through the discharge pipe 311.

The motor 1 is fixed to the closed container 307 by fitting the stator 10 into the closed container 307. After the motor 1 is mounted in the closed container 307, the compression mechanism 305 and the sub-frame 308 are assembled to both ends of the motor 1 in the axial direction. At this stage, an assembling operation is easier in a state where the permanent magnets 30 are not yet magnetized. Thus, it is desirable to perform the magnetization of the permanent magnets 30 in a state where the scroll compressor 300 is assembled as shown in FIG. 9.

In this first embodiment, the force generated in the rotor 20 in the second magnetization step is restrained as described above. Thus, the force required to hold the shaft 306 can be small when the magnetization of the permanent magnets 30 is performed in the state where the scroll compressor 300 is assembled. Accordingly, it is unnecessary to increase the strength of the jig for holding the shaft 306, and the magnetization step of the permanent magnets 30 can be simplified.

(Effects)

As described above, according to the first embodiment of the present invention, when the magnetization of the permanent magnets 30 is performed, the rotor 20 is placed so as to face the teeth 12 of the magnetization yoke 11 (or the teeth 18 of the stator 10). Then, the rotor 20 is rotated in the first rotating direction by the first angle θ1 from the rotational position where the center of the magnet insertion hole 23 in the circumferential direction faces the middle portion between both ends of the winding 8 (or the winding of the stator 10) in the circumferential direction, and the first magnetization step is performed. Further, the rotor 20 is rotated from the above described rotational position in the second rotating direction opposite to the first rotating direction by the second angle θ2 (<the first angle θ1), and the second magnetization step is performed. Therefore, the magnetization can be performed while making the direction of the magnetization flux and the easy magnetization direction be closer to parallel with each other on the one end side and the other end side of the permanent magnet 30. Accordingly, the magnetization current (the magnetization voltage) required for the magnetization of the permanent magnet 30 can be reduced. Further, the force generated in the rotor 20 can be restrained by setting the second angle θ2 smaller than the first angle θ1. Accordingly, the force required to hold the shaft of the rotor 20 can be reduced. That is, it is unnecessary to increase the strength of the jig for holding the shaft, and the magnetization step of the permanent magnets 30 can be simplified.

By setting the first angle θ1 within the range from 10 to 35 degrees, the magnetization current for the magnetization of the permanent magnet 30 can be further reduced.

Further, by forming the permanent magnet 30 of a neodymium rare earth magnet containing iron, neodymium, boron and dysprosium so that the dysprosium content is less than or equal to 4 weight percent, the manufacturing cost can be reduced. Even when the permanent magnet is formed to be thick in order to restrain the demagnetization due to the decrease in the dysprosium content, the magnetization current can be reduced and the force required to hold the shaft of the rotor 20 can be reduced by performing the first magnetization step and second magnetization step described above.

The decrease in the coercive force due to the low dysprosium content can be restrained by the diffusion of dysprosium in the permanent magnet 30. Even when the magnetizability is degraded by the diffusion of dysprosium, the magnetization current can be reduced and the force required to hold the shaft of the rotor 20 can be reduced by performing the first magnetization step and the second magnetization step described above.

Further, by forming the permanent magnet 30 of a neodymium rare earth magnet containing iron, neodymium, boron and terbium so that the terbium content is less than or equal to 4 weight percent, the manufacturing cost can be reduced. Even when the permanent magnet is formed to be thick in order to restrain demagnetization due to the decrease in the terbium content, the magnetization current can be reduced and the force required to hold the shaft of the rotor 20 can be reduced by performing the first magnetization step and the second magnetization step described above.

The decrease in the coercive force due to the low terbium content can be restrained by the diffusion of terbium in the permanent magnet 30. Even when the magnetizability is degraded by the diffusion of terbium, the magnetization current can be reduced and the force required to hold the shaft of the rotor 20 can be reduced by performing the first magnetization step and the second magnetization step described above.

In a case where the magnetization of the permanent magnets 30 is performed by using the stator 10 as a component of the motor 1, the magnetization of the permanent magnets 30 may be performed in the state where the scroll compressor 300 is assembled, for example. Since the assembling operation can be performed in the state where the permanent magnets 30 is not yet magnetized, the assembling operation becomes easier.

Further, when the reference straight line 28 is defined by a straight line connecting the two intersections 27 where the two straight lines 26 defining the interpolar portions intersect the outer circumference of the rotor core 21, at least a part of the permanent magnet 30 is located on the outer side of the reference straight line 28 in the radial direction. Thus, a width of the permanent magnet 30 can be increased, the output power of the motor 1 can be increased, and the magnetizability of the permanent magnet 30 can be enhanced. It is also possible to downsize the rotor 20 assuming that the width of the permanent magnet 30 is fixed at a constant width.

By providing the rotor 20 with the slits 25 on the outer side of the permanent magnet 30 in the radial direction, the magnetization flux flowing through the already-magnetized part of the permanent magnet 30 can be reduced, and thus the force generated in the rotor 20 can be restrained. Accordingly, the force required to hold the shaft of the rotor 20 can be reduced.

Second Embodiment

Next, a second embodiment of the present invention will be described. The second embodiment is intended to restrain a force generated in the rotor in the magnetization step of the permanent magnets in a configuration in which each permanent magnet corresponding to a magnetic pole is divided into a plurality of permanent magnets in order to reduce eddy current loss.

Figure 10A:
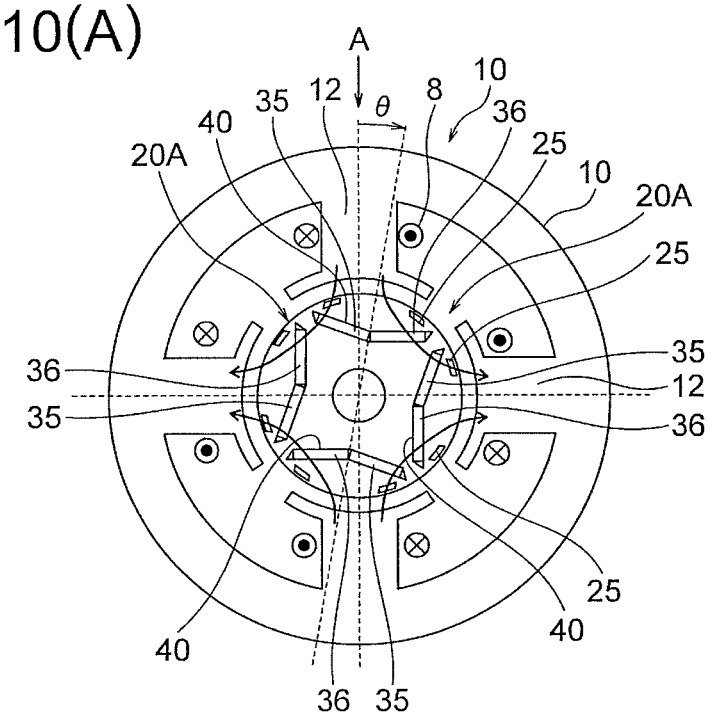
FIG. 10(A) is a sectional view showing a configuration for magnetization of permanent magnets of a rotor of a second embodiment of the present invention.
Figure 10B:
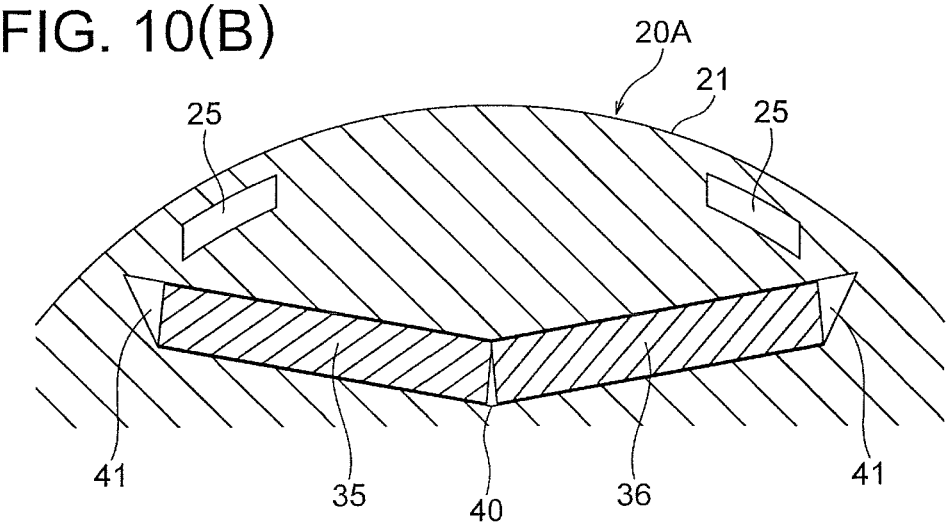
FIG. 10(B) is a sectional view showing a part of the rotor in an enlarged scale.

FIG. 10(A) is a sectional view showing a configuration for magnetization of permanent magnets of a rotor 20A of the second embodiment. FIG. 10(B) is a sectional view showing a part of the rotor 20A of the second embodiment in an enlarged scale. In the above first embodiment, each magnetic pole is formed by one permanent magnet 30 (FIG. 1). In contrast, in the second embodiment, each magnetic pole is formed by two permanent magnets 35 and 36.

In the rotor core 21, each magnet insertion hole 40 is formed corresponding to one magnetic pole. In this example, four magnet insertion holes 40 are formed. Two permanent magnets 35 and 36 are inserted into each magnet insertion hole 40.

The magnet insertion hole 40 has a V-shape such that a center portion in the circumferential direction protrudes inward in the radial direction. Slits 25 are formed on the outer side of each magnet insertion hole 40 in the radial direction. Positions and shapes of the slits 25 are similar to those of the slits 25 of the first embodiment.

The magnetizing method of the permanent magnets 30 is as described in the first embodiment. Specifically, the first magnetization step is performed after rotating the rotor 20A in the first rotating direction (for example, clockwise in FIG. 10(A)) by the first angle θ1 from the rotational position where the center of the magnet insertion hole 40 in the circumferential direction faces the middle portion (indicated by an arrow A in FIG. 10(A)) between both ends of the winding 8 (or the winding of the stator 10) in the circumferential direction. Then, the second magnetization step is performed after rotating the rotor 20A in the second rotating direction (for example, counterclockwise in FIG. 10(A)) opposite to the first rotating direction by the second angle θ2 from the above described rotational position. The second angle θ2 is smaller than the first angle θ1.

Dividing the permanent magnet corresponding to each magnetic pole into a plurality of permanent magnets 35 and 36 is effective for reducing the eddy current loss occurring in the permanent magnets 35 and 36. In this regard, at the time of magnetization, the permanent magnets 35 and 36 may move in the magnet insertion hole 40 in directions away from each other due to the repulsive force acting between the two permanent magnets 35 and 36. Thus, the direction of the magnetization flux may deviate from the easy magnetization direction of each of the permanent magnets 35 and 36, and the magnetization of mutually remote end parts of the permanent magnets 35 and 36 may be insufficient.

However, the first magnetization step is performed after the rotor 20A is rotated in the first rotating direction by the first angle θ1, and then the second magnetization step is performed after the rotor 20A is rotated in the second rotating direction by the second angle θ (<the first angle θ1) as described above. Thus, the magnetization can be performed while making the direction of the magnetization flux and the easy magnetization direction of each of the permanent magnets 35 and be closer to parallel with each other even when the permanent magnets 35 and 36 move in the magnet insertion hole 40. Accordingly, the permanent magnets 35 and 36 can be sufficiently magnetized.

In this case, in the second magnetization step, there is a possibility that a force may be generated in the rotor 20A by the interaction between the already-magnetized part of the permanent magnet 30 and the magnetization flux. However, since the second angle θ2 is set smaller than the first angle θ1 as described above, the force generated in the rotor 20A can be restrained. Accordingly, the force required to hold the shaft of the rotor 20A can be reduced.

Further, since the magnet insertion hole 40 has a V-shape such that a center in the circumferential direction protrudes inward in the radial direction, it is easy to make the direction of the magnetization flux be closer to parallel with the easy magnetization direction of each of the permanent magnets 35 and 36 (a thickness direction of each of the permanent magnets 35 and 36). Accordingly, the magnetization current required for the magnetization of the permanent magnets 35 and 36 can be reduced.

Also in this case, in the second magnetization step, there is a possibility that a force may be generated in the rotor 20A by the interaction between the already-magnetized part of the permanent magnet 30 and the magnetization flux. However, since the second angle θ2 is set smaller than the first angle θ1 as described above, the force generated in the rotor 20A can be restrained. Accordingly, the force required to hold the shaft of the rotor 20A can be reduced.

The rotor 20A of the second embodiment is configured in a similar manner to the rotor 20 described in the first embodiment except for the magnet insertion holes 40 and the permanent magnets 35 and 36. Further, a motor employing the rotor 20A of the second embodiment is employable in the scroll compressor 300 (FIG. 9) described in the first embodiment.

Incidentally, two permanent magnets 35 and 36 constituting one magnetic pole are inserted in each V-shaped magnet insertion hole 40 in this example. However, the shape of the magnet insertion hole 40 is not limited to the V-shape. For example, the magnet insertion hole 40 may have a straight shape (see FIG. 20(A)). Further, it is also possible to insert three or more permanent magnets in each magnet insertion hole 40. In this case, the magnet insertion hole 40 may have, for example, a bathtub shape (see FIG. 20(B)).

As described above, according to the second embodiment of the present invention, by dividing the permanent magnet corresponding to one magnetic pole into a plurality of (for example, two) permanent magnets 35 and 36, the eddy current loss occurring in the permanent magnets 35 and 36 can be reduced. Further, in the magnetization of the permanent magnets 30, the first magnetization step is performed after rotating the rotor 20A in the first rotating direction (for example, clockwise in FIG. 10(A)) by the first angle θ1 from the rotational position where the center of the magnet insertion hole 40 in the circumferential direction faces the middle portion between both ends of the winding 8 (or the winding of the stator 10) in the circumferential direction, and the second magnetization step is performed after rotating the rotor 20A from the above described rotational position in the second rotating direction opposite to the first rotating direction by the second angle θ2 (<the first angle θ1). Accordingly, even when the permanent magnets 35 and 36 move in the magnet insertion hole 40 due to the repulsive force acting therebetween, the magnetization current required for the magnetization of the permanent magnets 35 and 36 can be reduced. Further the force generated in the rotor 20A can be restrained, and accordingly the force required to hold the shaft of the rotor 20A can be reduced.

Further, since the magnet insertion hole 40 in which the two permanent magnets 35 and 36 are inserted has the V-shape such that the center in the circumferential direction protrudes inward in the radial direction, it is easy to make the direction of the magnetization flux be closer to parallel with the easy magnetization direction of each of the permanent magnets 35 and 36. Accordingly, the magnetization of the permanent magnets 35 and 36 can be performed using lower magnetization current.

Third Embodiment

Next, a third embodiment of the present invention will be described. The third embodiment of the present invention is intended to enhance magnetizability of the permanent magnets by devising a current supply method of the winding wound around the stator core.

FIG. 11 is a sectional view showing a configuration of a motor 1 of the third embodiment. The motor 1 shown in FIG. 11 includes a stator 10 and a rotor 20 rotatably provided inside the stator 10. The stator 10 includes a stator core 16 and a winding 9 wound around the stator core 16. The stator core 16 is formed by stacking a plurality of electromagnetic steel sheets (stacking elements) in the axial direction, each of the electromagnetic steel sheets having a thickness of, for example, 0.35 mm.

The stator core 16 includes a yoke part 17 having an annular shape and a plurality of (twelve in this example) teeth 18 protruding inward in the radial direction from the yoke part 17. The winding 9 is wound around each tooth 18. Further, an insulation part (an insulator or the like) is provided between the tooth 18 and the winding 9.

Here, the twelve teeth 18 are referred to as teeth 18a, 18b, 18c, 18d, 18e, 18f, 18g, 18h, 18i, 18j, 18k and 18l in an order clockwise in FIG. 11. Incidentally, the number and positions of the teeth 18 are not limited to the example illustrated herein.

The winding 9 includes three-phase windings. In this example, the winding 9 includes U-phase windings 91 and 94, V-phase windings 92 and 95, and W-phase windings 93 and 96.

The U-phase winding 91 is wound around the teeth 18a and 18k. The other U-phase winding 94 is wound around the teeth 18e and 18g. The V-phase winding 92 is wound around the teeth 18b and 18l. The other V-phase winding 95 is wound around the teeth 18f and 18h. The W-phase winding 93 is wound around the teeth 18c and 18a. The other W-phase winding 96 is wound around the teeth 18g and 18i. Incidentally, the winding method of the windings of the respective phases is not limited to the example illustrated herein.

When the magnetization is performed by supplying electric current to the three-phase windings 91 to 96, a reference of the rotation of the rotor 20 is a rotational position where the circumferential center of the magnet insertion hole 23 located at the uppermost position in FIG. 11 faces a middle portion (indicated by the arrow A) between both ends of the windings 91, 92 and 93 in the circumferential direction. The middle portion between both ends of the windings 91, 92 and 93 in the circumferential direction corresponds to a center of magnetic flux caused by the electric current flowing through the windings 91, 92 and 93. The first magnetization step is performed after rotating the rotor 20 in the first rotating direction (for example, clockwise in FIG. 11) by the first angle θ1 from the above described rotational position, and the second magnetization step is performed after rotating the rotor 20 in the second rotating direction (for example, counterclockwise in FIG. 11) opposite to the first rotating direction by the second angle θ2 from the above described rotational position. The second angle θ2 is smaller than the first angle θ1.

FIG. 12 is a diagram showing a current supply method (an electric current supply method) of the winding 9 for the magnetization of the permanent magnets 30. In FIG. 12, electric current is supplied to the V-phase windings 92 and 95 and the W-phase windings 93 and 96, whereas electric current is not supplied to the U-phase windings 91 and 94. Incidentally, winding patterns of the windings 92, 93, 95 and 96 are indicated by broken lines in FIG. 12.

By supplying electric current to the two-phase windings 92, 93, 95 and 96 among the three-phase windings 91 to 96 as above, magnetization flux directed from the teeth 18a and 18b toward the teeth 18k and 18d and magnetization flux directed from the teeth 18g and 18h toward the teeth 18e and 18j are caused, for example.

In this case, a rotational position of the rotor 20 where the center of the magnet insertion hole 23 in the circumferential direction located at the uppermost position in FIG. 12 faces a middle portion (indicated by the arrow A) between both ends of the windings 92 and 93 in the circumferential direction is defined as a reference of the rotation of the rotor 20. Here, the middle portion between both ends of the windings 92 and 93 in the circumferential direction corresponds to a center of magnetic flux caused by the electric current flowing through the windings 92 and 93.

The first magnetization step is performed after rotating the rotor 20 in the first rotating direction (for example, clockwise in FIG. 12) from the above described rotational position, and the second magnetization step is performed after rotating the rotor 20 in the second rotating direction (for example, counterclockwise in FIG. 12) opposite to the first rotating direction from the above described rotational position. The rotating directions are as described above.

By supplying electric current to the two-phase windings 92, 93, 95 and 96 as above, the direction of the magnetization flux and the easy magnetization direction of the permanent magnet 30 can be made to be further closer to parallel with each other as compared with a case where electric current is supplied to all of the three-phase windings 91 to 96. Especially, the direction of the magnetization flux and the easy magnetization direction of the permanent magnet 30 can be made to be closer to parallel with each other in a state where the rotor 20 is rotated in the first rotating direction and in the second rotating direction. In addition, the density of the magnetic flux passing through the permanent magnet 30 also becomes higher. Accordingly, the electric current required for the magnetization of the permanent magnet 30 can be reduced.

By reducing the electric current required for the magnetization of the permanent magnet 30 as above and setting the second angle θ2 smaller than the first angle θ1, the force generated in the rotor 20 in the second magnetization step can be restrained. Accordingly, the force required to hold the shaft of the rotor 20 can be reduced.

Incidentally, an example in which electric current is supplied to two-phase windings among the three-phase windings has been described. However, the current supply method is not limited to this example. It is sufficient that electric current is supplied to part of the windings wound around the teeth 18 of the stator 10 so as to make the direction of the magnetization flux and the easy magnetization direction of the permanent magnet 30 be closer to parallel with each other.

The rotor 20 of the third embodiment is configured in a similar manner to the rotor 20 of the first embodiment. The motor of the third embodiment is employable in the scroll compressor 300 (FIG. 9) described in the first embodiment.

Incidentally, although the rotor 20 described in the first embodiment is employed herein, it is also possible to employ the rotor 20A described in the second embodiment.

As described above, according to the third embodiment of the present invention, the permanent magnets 30 are magnetized by supplying electric current to part of the windings 91 to 96 wound around the teeth 18 of the stator 10 (for example, two-phase windings among the three-phase windings), and thus it is possible to make the direction of the magnetization flux and the easy magnetization direction of the permanent magnet 30 be further closer to parallel with each other. Further, the magnetic flux density becomes higher. Accordingly, it is possible to reduce the electric current required for the magnetization of the permanent magnet 30 and thereby restrain the force generated in the rotor 20. That is, the force required to hold the shaft of the rotor 20 can be reduced.

Fourth Embodiment

Next, a fourth embodiment of the present invention will be described. The fourth embodiment of the present invention is intended to reduce a reluctance torque and restrain a force generated in the rotor in the second magnetization step by providing a radially elongated slit on the outer side of the permanent magnet of the rotor in the radial direction.

Figure 13:
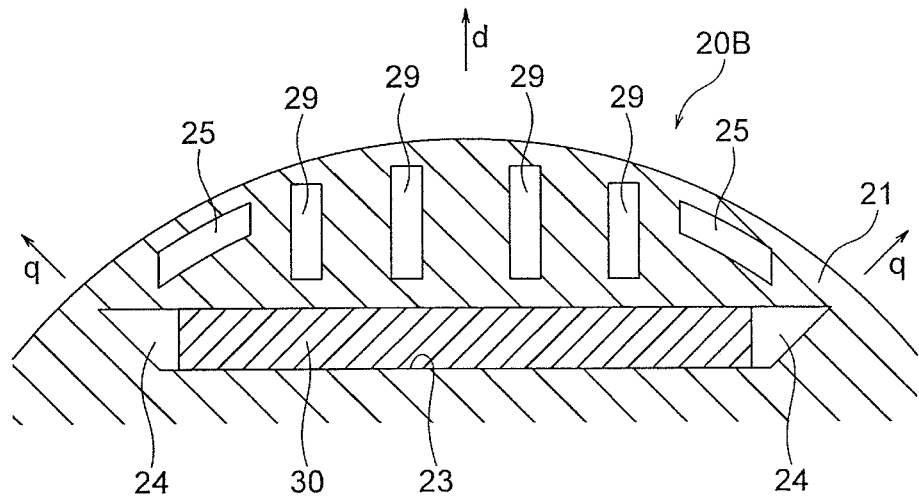
FIG. 13 is a sectional view showing a part of a rotor of a fourth embodiment of the present invention in an enlarged scale.

FIG. 13 is a sectional view showing a part of a rotor 20B of the fourth embodiment in an enlarged scale. As shown in FIG. 13, the rotor core 21 of the rotor 20B has slits 29 (referred to also as elongated holes) elongated in the radial direction, in addition to the slits 25. The slits 29 are formed on a radially outer side of the magnet insertion hole 23 in which the permanent magnet 30 is inserted.

In this example, four slits 29 are provided corresponding to each magnet insertion hole 23 (i.e., each magnetic pole). The slits 29 are located between the two slits 25 located at both ends of the magnet insertion hole 23. An inside of the slit 29 is a void, but may be a non-magnetic material. Incidentally, the number of the slits 29 is not limited to four. It is sufficient that at least at one slit 29, desirably two or more slits 29, are provided corresponding to each magnet insertion hole 23 (i.e., each magnetic pole).

The magnetizing method of the permanent magnets 30 is as described in the first embodiment. Specifically, the first magnetization step is performed after rotation in the first rotating direction (for example, clockwise in FIG. 13) by the first angle θ1 from the rotational position where the center of the magnet insertion hole 23 in the circumferential direction faces the middle portion between both ends of the winding 8 (or the winding of the stator 10) in the circumferential direction, and the second magnetization step is performed after rotation in the second rotating direction (for example, counterclockwise in FIG. 13) opposite to the first rotating direction by the second angle θ2 from the rotational position. The second angle θ2 is smaller than the first angle θ1.

In this fourth embodiment, the rotor 20B is provided with the slits 29, in addition to the slits 25, on the outer side of the permanent magnet 30 in the radial direction. Thus, a portion capable of becoming a magnetic path on the radially outer side of the permanent magnet 30 becomes smaller. Therefore, the magnetization flux flowing through the already-magnetized part of the permanent magnet 30 in the second magnetization step can be effectively reduced. Accordingly, the force generated in the rotor 20B by the interaction between the already-magnetized part of the permanent magnet 30 and the magnetization flux can be restrained.

Further, since the slit 29 has a shape elongated in the radial direction, q-axis electric current (electric current flowing from an interpolar portion to another interpolar portion) is impeded by the slits 29, and q-axis inductance Lq decreases. The reluctance torque decreases due to the decrease in the q-axis inductance Lq. Accordingly, the force generated in the rotor 20B in the second magnetization step by the interaction between the already-magnetized part of the permanent magnet 30 and the magnetization flux can be further restrained.

Although the slits 29 are formed on an inner side of the outer circumference of the rotor core 21, the slits 29 may be formed to reach the outer circumference of the rotor core 21.

Other configurations of the rotor 20B of the fourth embodiment are similar to those of the rotor 20 described in the first embodiment. A motor employing the rotor 20B of the fourth embodiment is employable in the scroll compressor 300 (FIG. 9) described in the first embodiment.

Incidentally, the rotor 20B of the fourth embodiment may be configured to include the magnet insertion hole 40 in which a plurality of permanent magnets 35 and 36 are inserted as described in the second embodiment. In a case where the magnetization of the permanent magnet 30 is performed by using the stator 10 of the motor 1, it is possible to employ the number and positions of the teeth 18 and the winding method and the current supply method of the winding 9 described in the third embodiment.

As described above, according to the fourth embodiment of the present invention, the rotor 20B includes the radially elongated slits 29 on the outer side of the permanent magnet 30 in the radial direction, and thus the magnetization flux flowing through the already-magnetized part of the permanent magnet 30 in the second magnetization step can be reduced and the reluctance torque can be reduced. Accordingly, the force generated in the rotor 20B can be restrained, and the force required to hold the shaft of the rotor 20B can be reduced.

Fifth Embodiment

Next, a fifth embodiment of the present invention will be described. The fifth embodiment of the present invention is intended to reduce the reluctance torque by making a gap between the rotor and the stator wider in a q-axis direction than in a d-axis direction, and thereby restrain the force generated in the rotor.

Figure 14:
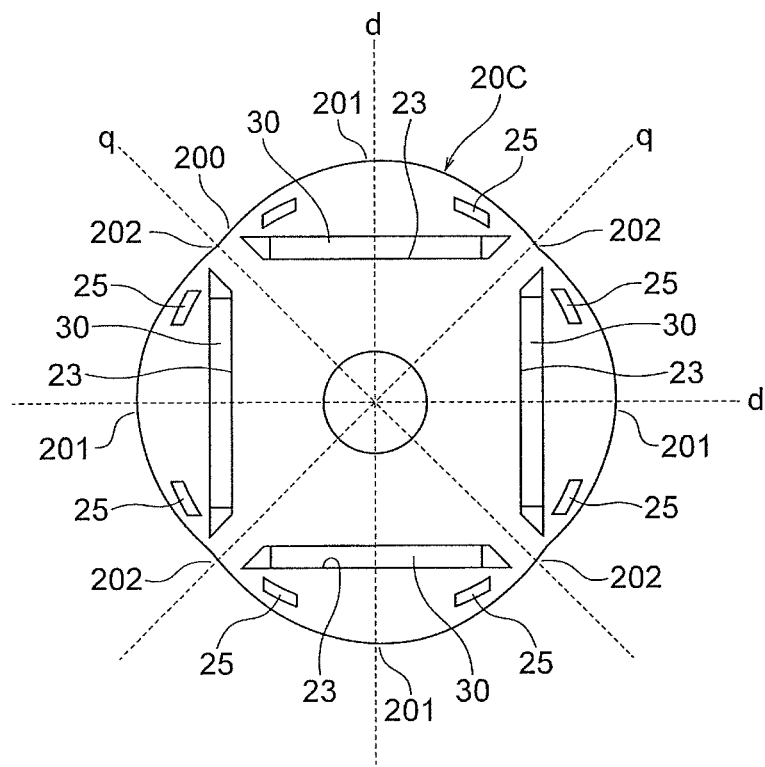
FIG. 14 is a sectional view showing a configuration of a rotor of a fifth embodiment of the present invention.

FIG. 14 is a sectional view showing a configuration of a rotor 20C of a motor of the fifth embodiment. A rotor core 200 of the rotor 20C has a shape such that an outer circumference 201 in the d-axis direction (a direction of a straight line passing through the center of the rotor 20C and the center of the magnetic pole) protrudes outward in the radial direction more than an outer circumference 202 in the q-axis direction (a direction of a straight line passing through the center of the rotor 20C and the interpolar portion). In other words, the distance from the center of the rotor core 200 to the outer circumference of the rotor core 200 is greater in the d-axis direction than in the q-axis direction.

Figure 15:
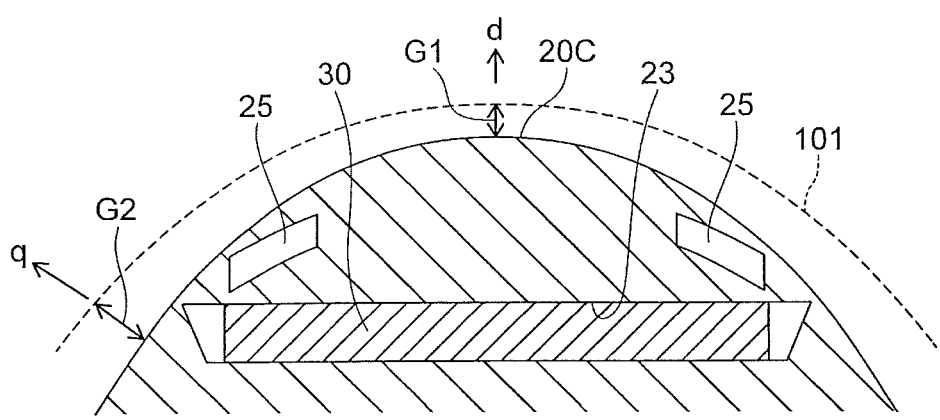
FIG. 15 is a sectional view showing a part of the rotor of the fifth embodiment in an enlarged scale.

FIG. 15 is a sectional view showing a part of the rotor 20C of the fifth embodiment in an enlarged scale. In FIG. 15, a broken line with a reference sign 101 indicates an arc representing an inner circumference of the stator 10, that is, an arc formed by extending the tip ends of the teeth 12 (FIG. 1) in the circumferential direction.

Since the rotor core 200 has a shape such that the outer circumference 201 in the d-axis direction protrudes outward in the radial direction more than the outer circumference 202 in the q-axis direction as described above, the gap between the rotor 20C and the stator 10 is wider in the q-axis direction (G2) than in the d-axis direction (G1) as shown in FIG. 15.

The rotor 20C includes the magnet insertion holes 23 and the slits 25 described in the first embodiment. The permanent magnet 30 described in the first embodiment is inserted in each magnet insertion hole 23.

The magnetizing method of the permanent magnets 30 is as described in the first embodiment. Specifically, the first magnetization step is performed after rotating the rotor 20C in the first rotating direction (for example, clockwise in FIG. 14) by the first angle θ1 from the rotational position where the center of the magnet insertion hole 23 in the circumferential direction faces the middle portion between both ends of the winding 8 (or the winding of the stator 10) in the circumferential direction, and the second magnetization step is performed after rotating the rotor 20C in the second rotating direction (for example, counterclockwise in FIG. 14) opposite to the first rotating direction by the second angle θ2 (<the first angle θ1) from the above described rotational position. The second angle θ2 is smaller than the first angle θ1.

In this fifth embodiment, the gap between the rotor 20C and the stator 10 is wider in the q-axis direction (G2) than in the d-axis direction (G1) as shown in FIG. 15. Therefore, the q-axis inductance Lq is reduced and the reluctance torque is reduced. Accordingly, as described in the fourth embodiment, the force generated in the rotor 20C in the second magnetization step by the interaction between the already-magnetized part of the permanent magnet 30 and the magnetization flux can be restrained.

Other configurations of the rotor 20C of the fifth embodiment are similar to those of the rotor 20 described in the first embodiment. A motor employing the rotor 20C of the fifth embodiment is employable in the scroll compressor 300 (FIG. 9) described in the first embodiment.

Incidentally, the rotor 20C of the fifth embodiment may be configured to include the magnet insertion hole 40 in which a plurality of permanent magnets 35 and 36 are inserted as described in the second embodiment. Further, in a case where the magnetization of the permanent magnet 30 is performed by using the stator 10 of the motor 1, it is possible to employ the number and positions of the teeth 18 and the winding method of and the current supply method of the winding 9 described in the third embodiment. The rotor 20C of the fifth embodiment may be further provided with the slits 29 described in the fourth embodiment.

As described above, according to the fifth embodiment of the present invention, the rotor 20C is configured so that the distance from the center of the rotor 20C to the outer circumference of the rotor 20C is greater in the d-axis direction than in the q-axis direction. Thus, the gap between the rotor 20C and the stator 10 becomes wider in the q-axis direction than in the d-axis direction. Therefore, the q-axis inductance can be reduced, and the reluctance torque can be reduced. Consequently, the force generated in the rotor 20C can be restrained, and the force required to hold the shaft of the rotor 20C can be reduced.

Sixth Embodiment

Next, a sixth embodiment of the present invention will be described. The sixth embodiment of the present invention is intended to restrain degradation in the magnetizability caused by provision of magnet positioning protrusions in a configuration in which the magnet insertion hole is provided with the magnet positioning protrusions for positioning the permanent magnet.

Figure 16:
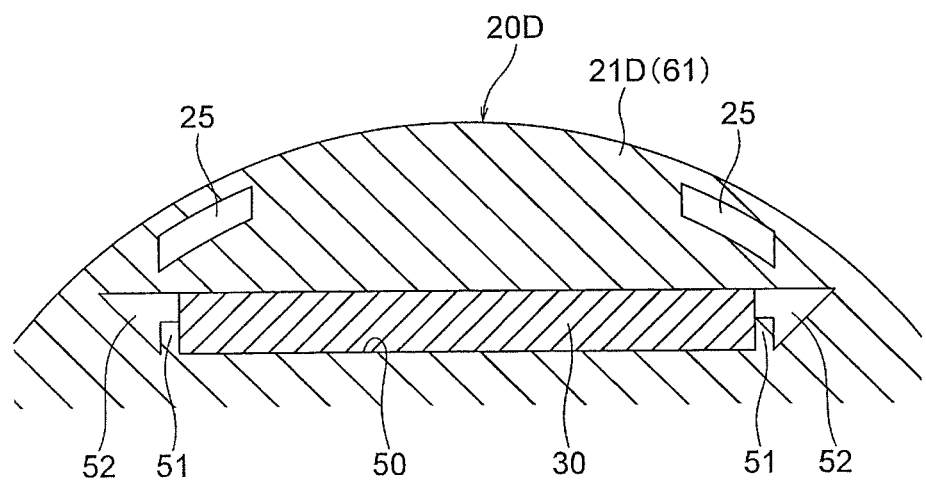
FIG. 16 is a sectional view showing a part of a rotor of a sixth embodiment of the present invention in an enlarged scale.

FIG. 16 is a sectional view showing a part of a rotor 20D of a motor of the sixth embodiment in an enlarged scale. A rotor core 21D of the rotor 20D includes magnet insertion holes 50 in each of which a permanent magnet 30 is inserted. The magnet insertion hole 50 is formed by providing the magnet positioning protrusions 51 in the magnet insertion hole 23 described in the first embodiment. The magnet positioning protrusions 51 are located on both sides of the permanent magnet 30 in the circumferential direction.

On the outer side of the magnet insertion hole 50 in the radial direction, the slits 25 described in the first embodiment are formed. On each end of the magnet insertion hole 50 in the circumferential direction, a leakage magnetic flux restraining part 52 similar to the leakage magnetic flux restraining part 24 of the first embodiment is formed.

Figure 17:
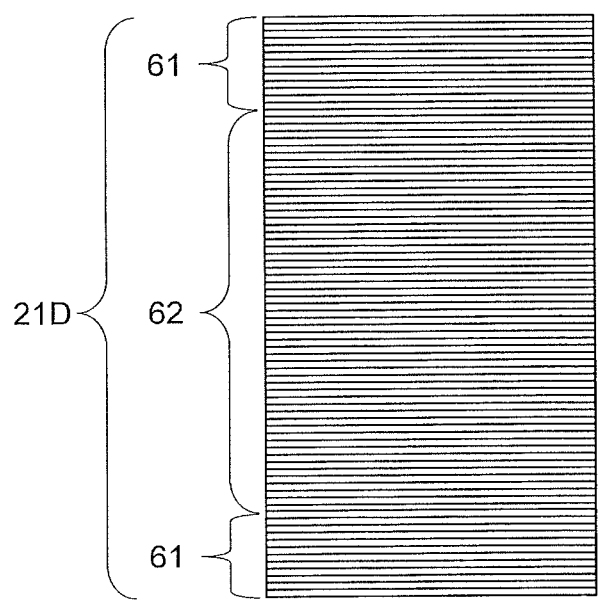
FIG. 17 is a diagram showing an example of a stacking structure of the rotor of the sixth embodiment.

FIG. 17 is a sectional view showing a stacking structure of the rotor core 21D of the rotor 20D. The rotor core 21D is formed by stacking a plurality of electromagnetic steel sheets (stacking elements) in the direction of the rotation axis. In this example, the rotor core 21D is formed by stacking first electromagnetic steel sheets (first stacking elements) 61 and second electromagnetic steel sheets (second stacking elements) 62 in the direction of the rotation axis. Each of the first electromagnetic steel sheets 61 has the magnet positioning protrusions 51 in the magnet insertion hole 50 as shown in FIG. 16. In contrast, each of the second electromagnetic steel sheets 62 does not have the magnet positioning protrusions 51 in the magnet insertion hole 50.

In this example, the first electromagnetic steel sheets 61 are located at least at one end part (desirably, both end parts) of the electromagnetic steel sheets of the rotor core 21D in the stacking direction of the rotor core 21D. The second electromagnetic steel sheets 62 are located at a central part of the electromagnetic steel sheets in the stacking direction. The magnetizing method of the permanent magnets 30 is as described in the first embodiment.

The magnet positioning protrusions 51 in the magnet insertion hole 50 have a function to restrain movement of the permanent magnet 30 in the magnet insertion hole 50. However, since the magnet positioning protrusions 51 are made of magnetic material, there is a possibility that magnetization flux intended to flow through the permanent magnet 30 may flow into the magnet positioning protrusions 51, and the magnetization of the permanent magnet 30 may be insufficient.

Thus, in this sixth embodiment, the rotor core 21D is configured by stacking the first electromagnetic steel sheets 61 having the magnet positioning protrusions 51 in the magnet insertion hole 50 and the second electromagnetic steel sheets 62 not having the magnet positioning protrusions 51 in the magnet insertion hole 50. A total thickness of the first electromagnetic steel sheets 61 is less than a total thickness of the second electromagnetic steel sheets 62.

With such a configuration, the magnet positioning protrusions 51 are provided in the magnet insertion hole 50 of the first electromagnetic steel sheets 61, and thus the movement of the permanent magnet 30 in the magnet insertion hole 50 can be restrained.

Further, since the total thickness of the second electromagnetic steel sheets 62 not having the magnet positioning protrusions 51 is greater than the total thickness of the first electromagnetic steel sheets 61 having the magnet positioning protrusions 51, the flow of the magnetization flux into the magnet positioning protrusions 51 can be restrained and sufficient magnetization of the permanent magnet 30 can be performed.

Especially, the first electromagnetic steel sheets 61 are located on at least one end part (desirably, both end parts) of the electromagnetic steel sheets of the rotor core 21D in the stacking direction. Thus, when the permanent magnet 30 is inserted into the magnet insertion hole 50 in the direction of the rotation axis, the magnet positioning protrusions 51 are located at a near side in the inserting direction. Therefore, an inserting operation of the permanent magnet 30 is facilitated.

Figure 18:
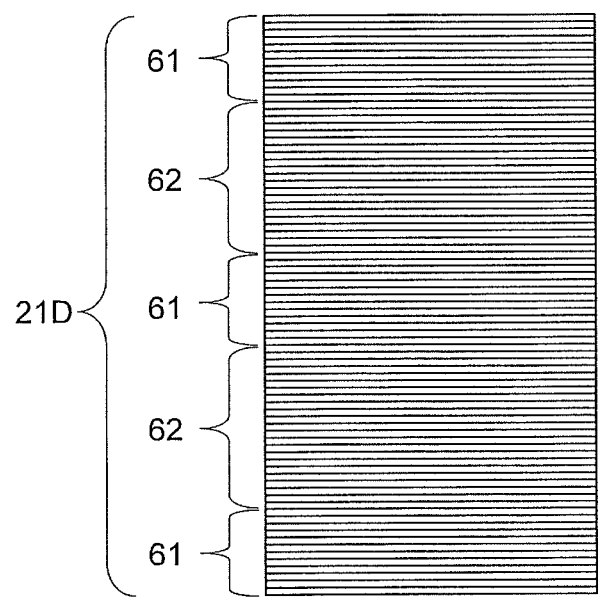
FIG. 18 is a diagram showing another example of the stacking structure of the rotor of the sixth embodiment.

Incidentally, the stacking structure is not limited to that shown in FIG. 17. For example, as shown in FIG. 18, it is also possible to locate the first electromagnetic steel sheets 61 in both end parts and a central part of the electromagnetic steel sheets of the rotor core 21D in the stacking direction, and locate the second electromagnetic steel sheets 62 between adjacent sets of the first electromagnetic steel sheets 61. Also in this case, the inserting operation of the permanent magnet 30 is facilitated since the first electromagnetic steel sheets 61 are located at least at one end part in the stacking direction.

Other configurations of the rotor 20D of the sixth embodiment are similar to those of the rotor 20 described in the first embodiment. A motor employing the rotor 20D of the sixth embodiment is employable in the scroll compressor 300 (FIG. 9) described in the first embodiment.

Incidentally, the magnet insertion hole 50 of the rotor 20D of the sixth embodiment may also be implemented by providing the magnet positioning protrusions 51 in the magnet insertion hole 40 in which a plurality of permanent magnets 35 and 36 are inserted as described in the second embodiment. Further, in a case where the magnetization of the permanent magnets 30 is performed by using the stator 10 of the motor 1, it is possible to employ the number and positions of the teeth 18 and the winding method and the current supply method of the winding 9 described in the third embodiment. The rotor 20D of the sixth embodiment may be further provided with the slits 29 described in the fourth embodiment. The rotor 20D of the sixth embodiment may have the shape for reducing the reluctance torque described in the fifth embodiment.

As described above, according to the sixth embodiment of the present invention, the rotor 20D is configured by stacking the first electromagnetic steel sheets 61 (first stacking elements) provided with the magnet positioning protrusions 51 in the magnet insertion hole 50 and the second electromagnetic steel sheets 62 (second stacking elements) not provided with the magnet positioning protrusions 51 in the magnet insertion hole 50. The total thickness of the first electromagnetic steel sheets 61 is less than the total thickness of the second electromagnetic steel sheets 62. Thus, the movement of the permanent magnet 30 in the magnet insertion hole 50 can be restrained and sufficient magnetization of the permanent magnet 30 can be performed.

Further, the inserting operation of the permanent magnet 30 can be facilitated by locating the first electromagnetic steel sheets 61 on at least one end part (desirably, both end parts) of the electromagnetic steel sheets of the rotor core 21D in the stacking direction.

Modifications.

Next, modifications of the embodiments will be described. Although the inside of the slit 25 of the rotor core 21 is a void in the above described first embodiment, a non-magnetic body 55 (for example, aluminum or plastic) may be provided in the slit 25 of the rotor core 21 as shown in FIG. 18. The same can be said to the slits 25 of the second to sixth embodiments.

Figure 20A:
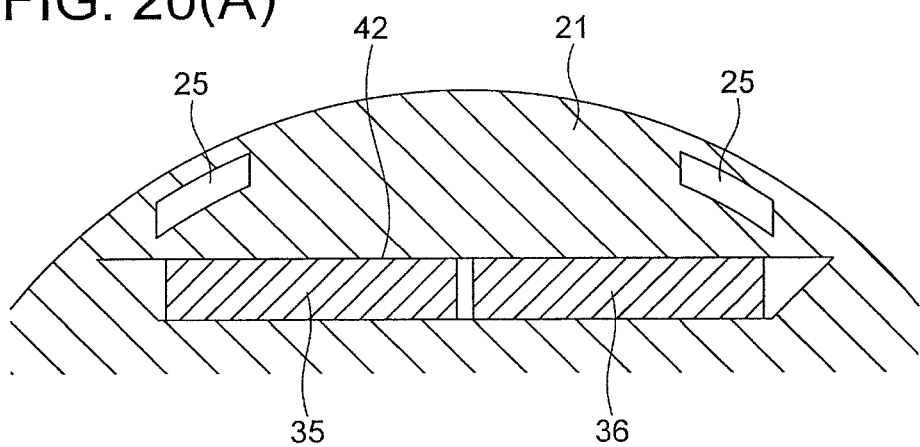
FIGS. 20(A) and 20(B) are sectional views showing configurations of rotors of modifications.

Further, although the permanent magnets 35 and 36 are inserted in the magnet insertion hole 40 having the V-shape (FIG. 10(B)) in the above described second embodiment, the permanent magnets 35 and 36 may be inserted in a magnet insertion hole 42 having a straight shape as shown in FIG. 20(A).

Figure 20B:
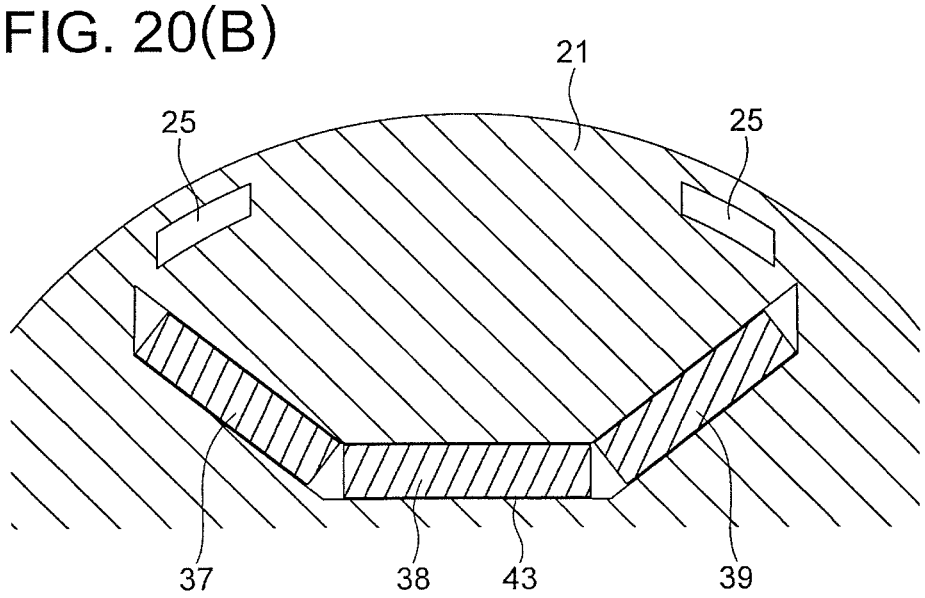

It is also possible that three or more permanent magnets form one magnetic pole. In this case, for example, as shown in FIG. 20(B), three permanent magnets 37, 38 and 39 may be inserted in a magnet insertion hole 43 having a bathtub shape. In this regard, the bathtub shape means a shape including a central part extending straight and two parts extending outward in the radial direction of the rotor core 21 from both ends of the central part in a lengthwise direction of the central part so that a distance between the two parts increases as moving outward in the radial direction.

While preferred embodiments of the present invention have been described specifically above, the present invention is not limited to the above described embodiments and a variety of enhancements or modifications are possible within the range not departing from the subject matter of the present invention.

What is claimed is:

1. A magnetizing method comprising the steps of:
preparing a rotor comprising a rotor core having a magnet insertion hole and a permanent magnet provided in the magnet insertion hole, wherein when a reference straight line is defined as a straight line connecting two intersections where two straight lines each defining an interpolar portion intersect an outer circumference of the rotor core, at least a part of the permanent magnet is located on an outer side of the reference straight line in a radial direction;
placing the rotor so as to face a tooth around which a winding is wound;
rotating the rotor in a first rotating direction by a first angle θ1 from a rotational position where a center of the magnet insertion hole in a circumferential direction of the rotor core faces a middle portion between both ends of the winding in the circumferential direction and supplying electric current to the winding, and
rotating the rotor in a second rotating direction opposite to the first rotating direction by a second angle θ2 from the rotational position and supplying electric current to the winding,
wherein the second angle θ2 is smaller than the first angle θ1.

2. The magnetizing method according to claim 1, wherein the first angle θ1 is within a range from 10 to 35 degrees in terms of an electrical angle.

3. The magnetizing method according to claim 1, wherein the permanent magnet is a neodymium rare earth magnet containing at least iron, neodymium, boron and dysprosium, and wherein a dysprosium content is less than or equal to 4 weight percent.

4. The magnetizing method according to claim 3, wherein dysprosium is diffused in the permanent magnet.

5. The magnetizing method according to claim 1, wherein the permanent magnet is a neodymium rare earth magnet containing at least iron, neodymium, boron and terbium, and wherein a terbium content is less than or equal to 4 weight percent.

6. The magnetizing method according to claim 5, wherein terbium is diffused in the permanent magnet.

7. The magnetizing method according to claim 1, wherein a stator core of a stator coupled with the rotor to constitute a motor is used for magnetization of the permanent magnet, and wherein the stator core has the tooth.

8. The magnetizing method according to claim 7, wherein the stator has a plurality of windings wound around the stator core, and wherein part of the plurality of windings is used for magnetization of the permanent magnet.

9. The magnetizing method according to claim 7, wherein the stator has three-phase windings wound around the stator core, and wherein two-phase windings among the three-phase windings are used for magnetization of the permanent magnet.

10. The magnetizing method according to claim 1, wherein the permanent magnet has two permanent magnets provided in the magnet insertion hole.

11. The magnetizing method according to claim 10, wherein the magnet insertion hole has a V-shape such that a center portion of the magnet insertion hole in the circumferential direction of the rotor core protrudes inward in a radial direction of the rotor core.

12. The magnetizing method according to claim 1, wherein the rotor core has a slit on an outer side of the permanent magnet in a radial direction of the rotor core.

13. The magnetizing method according to claim 12, wherein the rotor core further has at least another slit, which is elongated in the radial direction of the rotor core, on the outer side of the permanent magnet in the radial direction of the rotor core.

14. The magnetizing method according to claim 1, wherein a distance from a center of the rotor core to an outer circumference of the rotor core is greater in a d-axis direction than in a q-axis direction.

15. The magnetizing method according to claim 1, wherein the rotor core is formed by stacking a plurality of stacking elements in a direction of a rotation axis,
wherein the plurality of stacking elements have a first stacking element having a magnet insertion hole provided with a magnet positioning protrusion and a second stacking element having a magnet insertion hole not provided with a magnet positioning protrusion, and
wherein a total thickness of the first stacking element is less than a total thickness of the second stacking element.

16. The magnetizing method according to claim 15, wherein the first stacking element is located at least at one end part of the rotor core in a stacking direction of the rotor core.

17. A rotor comprising:
a rotor core having a magnet insertion hole, and a permanent magnet provided in the magnet insertion hole, wherein when a reference straight line is defined as a straight line connecting two intersections where two straight lines each defining an interpolar portion intersect an outer circumference of the rotor core, at least a part of the permanent magnet is located on an outer side of the reference straight line in a radial direction;

wherein the permanent magnet is magnetized by:

placing the rotor so as to face a tooth around which a winding is wound;

rotating the rotor in a first rotating direction by a first angle θ1 from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle θ2 from the rotational position and supplying electric current to the winding to electric current to the winding, wherein the second angle θ2 is smaller than the first angle θ1.

18. A motor comprising a stator and a rotor provided inside the stator, the rotor comprising:

a rotor core having a magnet insertion hole, and a permanent magnet provided in the magnet insertion hole, wherein when a reference straight line is defined as a straight line connecting two intersections where two straight lines each defining an interpolar portion intersect an outer circumference of the rotor core, at least a part of the permanent magnet is located on an outer side of the reference straight line in a radial direction;

wherein the permanent magnet is magnetized by:

placing the rotor so as to face a tooth around which a winding is wound;

rotating the rotor in a first rotating direction by a first angle θ1 from a rotational position where a center of the magnet insertion hole in a circumferential direction of the rotor core faces a middle portion between both ends of the winding in the circumferential direction and supplying electric current to the winding, and rotating the rotor in a second rotating direction opposite to the first rotating direction by a second angle θ2 from the rotational position and supplying electric current to the winding, wherein the second angle θ2 is smaller than the first angle θ1.

19. A scroll compressor comprising a closed container, a compression mechanism provided in the closed container, and the motor according to claim 18 to drive the compression mechanism.

* * * * *